United States Patent
Takano

(10) Patent No.: US 10,743,224 B2
(45) Date of Patent: Aug. 11, 2020

(54) DEVICE AND METHOD

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 102 days.

(21) Appl. No.: 15/308,129

(22) PCT Filed: Apr. 22, 2015

(86) PCT No.: PCT/JP2015/062248
§ 371 (c)(1),
(2) Date: Nov. 1, 2016

(87) PCT Pub. No.: WO2015/182299
PCT Pub. Date: Dec. 3, 2015

(65) Prior Publication Data
US 2017/0055190 A1 Feb. 23, 2017

(30) Foreign Application Priority Data

May 29, 2014 (JP) .................................. 2014-111656

(51) Int. Cl.
*H04W 36/04* (2009.01)
*H04W 36/30* (2009.01)
(Continued)

(52) U.S. Cl.
CPC .......... *H04W 36/04* (2013.01); *H01Q 3/2605* (2013.01); *H04B 7/0465* (2013.01);
(Continued)

(58) Field of Classification Search
CPC ........... H01L 21/681; H01L 21/68728; H04W 16/28; H04W 24/00; H04W 24/10;
(Continued)

(56) References Cited

U.S. PATENT DOCUMENTS

2007/0115800 A1* 5/2007 Fonseka ................ H04L 1/0054
370/208
2009/0098874 A1 4/2009 Goransson et al.
(Continued)

FOREIGN PATENT DOCUMENTS

| JP | 2011-4056 A | 1/2011 |
|---|---|---|
| JP | 2013-546241 A | 12/2013 |
| WO | 2010/125635 A1 | 11/2010 |

OTHER PUBLICATIONS

"On Elevation Beamforming/Full-Dimension (FD) MIMO for LTE," 3GPP TSG RAN WG1 #78 BIS, R1-144056, Agenda Item 7.3.3.1, Oct. 2014, (2 pages).

(Continued)

*Primary Examiner* — Erica Navar
(74) *Attorney, Agent, or Firm* — Xsensus LLP

(57) ABSTRACT

[Object] To make it possible to select a cell that is more preferable for a terminal device in an environment in which beamforming is performed.

[Solution] There is provided a device including: an acquiring unit configured to acquire received quality information indicating received quality of a reference signal in a terminal device; and a control unit configured to perform cell selection for the terminal device based on the received quality information. When a predetermined condition related to use of weight sets for beamforming by a base station is satisfied, the control unit does not perform the selection based on the received quality information.

13 Claims, 20 Drawing Sheets

(51) Int. Cl.
  *H04W 72/08* (2009.01)
  *H04W 36/38* (2009.01)
  *H04L 1/00* (2006.01)
  *H04W 48/20* (2009.01)
  *H01Q 3/26* (2006.01)
  *H04W 36/00* (2009.01)
  *H04W 36/36* (2009.01)
  *H04W 72/04* (2009.01)
  *H04B 7/0456* (2017.01)
  *H04B 7/06* (2006.01)
  *H04W 72/12* (2009.01)
  *H04W 36/20* (2009.01)
  *H04W 36/26* (2009.01)
  *H04W 28/16* (2009.01)
  *H04L 5/00* (2006.01)
  *H04W 16/28* (2009.01)

(52) U.S. Cl.
  CPC ......... *H04B 7/0617* (2013.01); *H04B 7/0695* (2013.01); *H04L 1/0026* (2013.01); *H04L 5/0051* (2013.01); *H04W 28/16* (2013.01); *H04W 36/0044* (2013.01); *H04W 36/0061* (2013.01); *H04W 36/0094* (2013.01); *H04W 36/20* (2013.01); *H04W 36/26* (2013.01); *H04W 36/30* (2013.01); *H04W 36/36* (2013.01); *H04W 36/38* (2013.01); *H04W 48/20* (2013.01); *H04W 72/046* (2013.01); *H04W 72/08* (2013.01); *H04W 72/1231* (2013.01); *H04L 5/001* (2013.01); *H04L 5/005* (2013.01); *H04L 5/006* (2013.01); *H04L 5/0023* (2013.01); *H04W 16/28* (2013.01); *H04W 36/0069* (2018.08)

(58) Field of Classification Search
  CPC ............. H04W 28/04; H04W 36/0083; H04W 36/0094; H04W 36/30; H04W 48/18; H04W 72/0413; H04W 72/046; H04W 72/1231; H04W 88/06; H04W 88/08; H04W 92/20; H04L 1/0026; H04L 1/20; H01Q 1/246; H04B 7/0452; H04B 7/0639; H04B 7/024; H04B 7/0417; H04B 7/0465; H04B 7/0626; H04B 7/0632; H04B 7/0634; H04B 7/0645; H04B 7/0689
  See application file for complete search history.

(56) References Cited

U.S. PATENT DOCUMENTS

2010/0291931 A1* 11/2010 Suemitsu ............ H04W 36/245
                                                                455/436
2012/0087265 A1    4/2012 Tamaki et al.
2013/0201862 A1    8/2013 Cui et al.

OTHER PUBLICATIONS

International Search Report dated Jun. 16, 2015 in PCT/JP15/62248 filed Apr. 22, 2015.

* cited by examiner

DEVICE AND METHOD

TECHNICAL FIELD

The present disclosure relates to a device and a method.

BACKGROUND ART

Currently, in the Third Generation Partnership Project (3GPP), in order to accommodate explosively increasing traffic, various technologies for increasing the capacity of cellular systems are being investigated. In the future, it is predicted that a capacity of about 1000 times the current capacity will be necessary. Technologies such as multi-user multiple-input multiple-output (MU-MIMO) and coordinated multipoint (CoMP) are considered to increase the capacity of cellular systems to only about several times the previous capacity. Therefore, a breakthrough technique is necessary.

For example, as a technique for significantly increasing the capacity of cellular systems, a base station that uses a directional antenna including multiple antenna elements (for example, about 100 antenna elements) and performs beamforming is considered. Such technology is a form of technology called large-scale MIMO or massive MIMO. According to such beamforming, a half width of a beam is narrowed. That is, a sharp beam is formed. In addition, when the multiple antenna elements are arranged on a plane, it is also possible to form a beam in a desired three-dimensional direction.

Various beamforming technologies are proposed. For example, in Patent Literature 1, technology for implementing beamforming by a base station even when frequency bands of an upstream channel and a downstream channel are different is disclosed.

CITATION LIST

Patent Literature

Patent Literature 1 JP 2011-004056A

SUMMARY OF INVENTION

Technical Problem

However, when beamforming is performed, received quality of a reference signal (for example, reference signal received quality (RSRQ)) may be significantly varied. For example, interference from another base station may be significantly varied according to which weight set is used for the other base station to perform beamforming. Therefore, for example, a received signal strength indicator (RSSI) significantly varies and RSRQ also significantly varies. Specifically, when the beamforming is large-scale MIMO or massive MIMO beamforming, there is a possibility of RSRQ being significantly greatly varied. As a result, for example, a cell that is not preferable as a cell in which a terminal device performs wireless communication (for example, a target cell of a handover) may be selected.

Therefore, it is preferable to provide a mechanism through which it is possible to select a cell that is more preferable for a terminal device in an environment in which beamforming is performed.

Solution to Problem

According to the present disclosure, there is provided a device including: an acquiring unit configured to acquire received quality information indicating received quality of a reference signal in a terminal device; and a control unit configured to perform cell selection for the terminal device based on the received quality information. When a predetermined condition related to use of weight sets for beamforming by a base station is satisfied, the control unit does not perform the selection based on the received quality information.

According to the present disclosure, there is provided a method including: acquiring received quality information indicating received quality of a reference signal in a terminal device; and performing, by a processor, cell selection for the terminal device based on the received quality information. When a predetermined condition related to use of weight sets for beamforming by a base station is satisfied, the selection is not performed based on the received quality information.

According to the present disclosure, there is provided a device including: an acquiring unit configured to acquire one or more weight sets for beamforming; and a control unit configured to control wireless communication by a base station such that the base station transmits a signal using the one or more weight sets. The control unit controls the wireless communication such that the one or more weight sets are used to transmit a signal in limited radio resources.

According to the present disclosure, there is provided a method including: acquiring one or more weight sets for beamforming; and controlling, by a processor, wireless communication by a base station such that the base station transmits a signal using the one or more weight sets. The controlling of the wireless communication includes controlling, by the processor, the wireless communication such that the one or more weight sets are used to transmit a signal in limited radio resources.

Advantageous Effects of Invention

According to the present disclosure described above, it is possible to select a cell that is more preferable for a terminal device in an environment in which beamforming is performed. Note that the effects described above are not necessarily limitative. With or in the place of the above effects, there may be achieved any one of the effects described in this specification or other effects that may be grasped from this specification.

DESCRIPTION OF EMBODIMENT(S)

Figure 1:
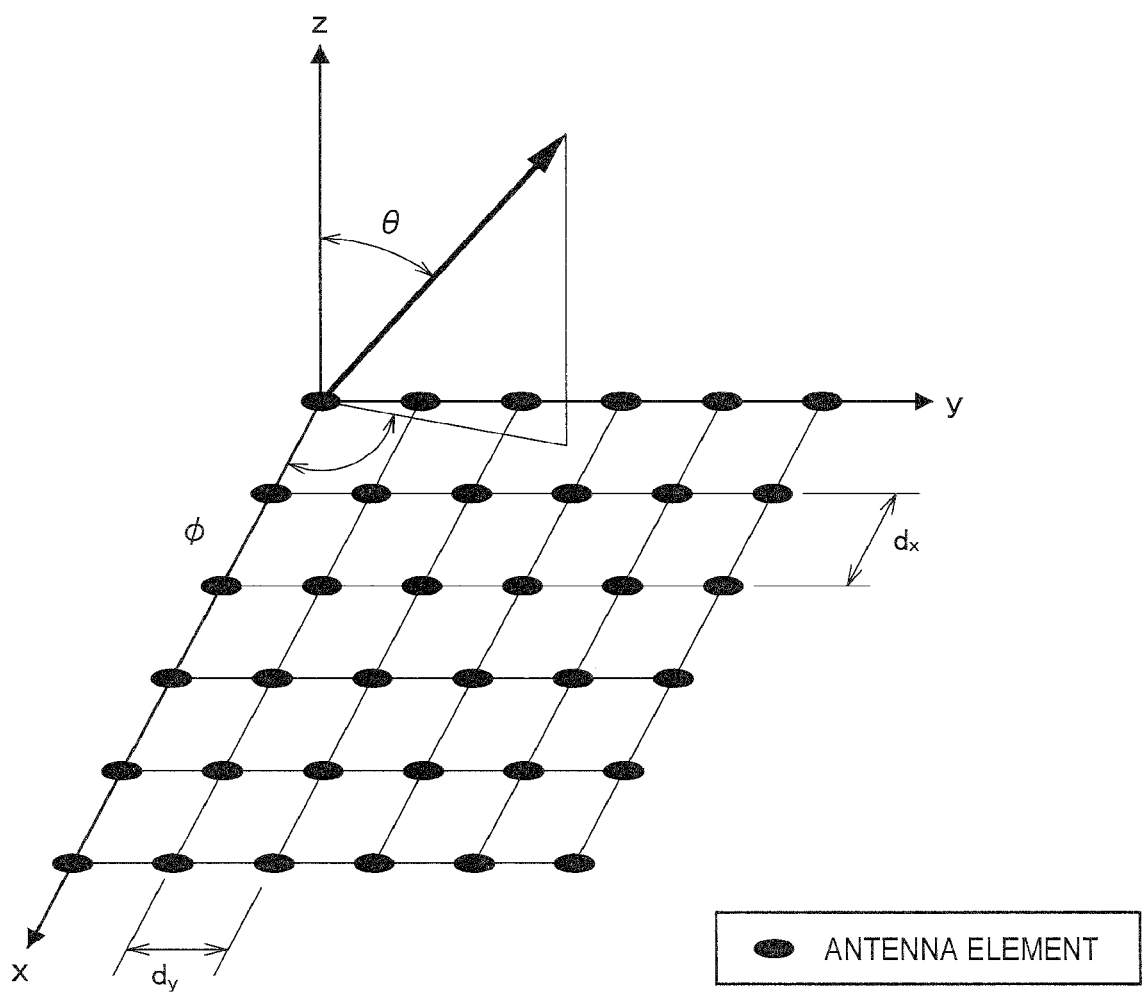
FIG. 1 is an explanatory diagram for describing a weight set for large-scale MIMO beamforming.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

In this specification and the drawings, there are cases in which components having substantially the same functional configuration are distinguished by adding different alphabets to the end of the same reference numeral. For example, a plurality of components having substantially the same functional configuration are distinguished like terminal devices 200A, 200B, and 200C as necessary. However, when a plurality of components having substantially the same functional configuration need not be particularly distinguished, only the same reference numeral is added. For example, when the terminal devices 200A, 200B, and 200C need not be particularly distinguished, they are referred to simply as a "terminal devices 200."

The description will proceed in the following order.
1. Introduction
2. Schematic configuration of communication system
3. First Embodiment
3.1. Configuration of base station
3.2. Process flow
4. Second Embodiment
4.1. Configuration of terminal device
4.2. Process flow
5. Third Embodiment
5.1. Configuration of base station
5.2. Process flow
6. Application examples
6.1. Application examples for base station
6.2. Application examples for terminal device
7. Conclusion

1. INTRODUCTION

First, beamforming, measurement and cell selection will be described with reference to FIG. 1 and FIG. 2.
(Beamforming)
(a) Necessity of Large-Scale MIMO Currently, in the 3GPP, in order to accommodate explosively increasing traffic, various technologies for increasing the capacity of cellular systems are being investigated. In the future, it is predicted that a capacity of about 1000 times the current capacity will be necessary. Technologies such as MU-MIMO and CoMP are considered to increase the capacity of cellular systems to only about several times the previous capacity. Therefore, a breakthrough technique is necessary.

In 3GPP release 10, an eNodeB in which eight antennas are implemented is standardized. According to the antennas, eight-layer MIMO can be implemented in single-user multiple-input multiple-output (SU-MIMO). 8-layer MIMO is technology in which eight independent streams are spatially multiplexed. In addition, it is possible to implement two-layer MU-MIMO with four users.

In user equipment (UE), it is difficult to increase the number of antenna elements of an antenna of the UE due to a small space for arranging antennas and a limited UE processing capacity. However, according to recent advances in antenna mounting technology, it is possible to arrange a directional antenna including about 100 antenna elements in an eNodeB.

For example, as a technique for significantly increasing the capacity of cellular systems, a base station that uses a directional antenna including multiple antenna elements (for example, about 100 antenna elements) and performs beamforming is considered. Such technology is a form of technology called large-scale MIMO or massive MIMO. According to such beamforming, a half width of a beam is narrowed. That is, a sharp beam is formed. In addition, when the multiple antenna elements are arranged on a plane, it is also possible to form a beam in a desired three-dimensional direction. For example, a technique is proposed in which a beam directed toward a position higher than a base station (for example, an upper floor of a high-rise building) is formed, and thus a signal is transmitted to a terminal device in such a position.

In typical beamforming, it is possible to change a direction of a beam in a horizontal direction. Therefore, the typical beamforming may be referred to as two-dimensional beamforming. On the other hand, in large-scale MIMO (or massive MIMO) beamforming, it is possible to change a direction of a beam in a vertical direction in addition to the horizontal direction. Therefore, the large-scale MIMO beamforming may be referred to as three-dimensional beamforming.

Since the number of antennas increases, it is possible to increase the number of users of MU-MIMO. Such technology is another form of technology called large-scale MIMO or massive MIMO. When the number of antennas of a UE is 2, the number of streams that are spatially independent in a single UE is 2. Therefore, increasing the number of users of MU-MIMO is more reasonable than increasing the number of streams in a single UE.

(b) Weight Set

A weight set for beamforming (that is, a set of weight coefficients for multiple antenna elements) is represented as a complex number. Hereinafter, an example of a weight set for large-scale MIMO beamforming will be described specifically with reference to FIG. 1.

FIG. 1 is an explanatory diagram for describing a weight set for large-scale MIMO beamforming. Referring to FIG. 1, antenna elements arranged in a grid pattern are shown. In addition, two orthogonal axes x and y on a plane in which antenna elements are arranged and one axis z orthogonal to the plane are shown. Here, a direction of a beam to be formed is indicated by, for example, an angle phi (a Greek letter) and an angle theta (a Greek letter). The angle phi (a Greek letter) is an angle formed by a component of an xy plane within a beam direction and the x axis. In addition, the angle theta (a Greek letter) is an angle formed by a beam direction and the z axis. In this case, for example, a weight coefficient $V_{m,n}$ of an antenna element that is arranged at an m-th point in an x axis direction and arranged at an n-th point in a y axis direction may be represented as follows.

$$V_{m,n}(\theta, \varphi, f) = \exp\left(j2\pi\frac{f}{c}\{(m-1)d_x\sin(\theta)\cos(\varphi) + (n-1)d_y\sin(\theta)\sin(\varphi)\}\right)$$ [Math. 1]

f denotes a frequency and c denotes the speed of light. j denotes an imaginary unit of a complex number. $d_x$ denotes an interval between antenna elements in the x axis direction. $d_y$ denotes an interval between antenna elements in the y axis direction. Coordinates of the antenna element are represented as follows.

$$x=(m-1)d_x, y=(n-1)d_y$$ [Math. 2]

A weight set for typical beamforming (two-dimensional beamforming) may be decomposed into a weight set for forming a beam in a desired horizontal direction and a weight set for adjusting transfer between antennas. Therefore, a weight set for large-scale MIMO beamforming may be decomposed into a first weight set for forming a beam in a desired vertical direction, a second weight set for forming a beam in a desired horizontal direction and a third weight set for adjusting transfer between antennas.

(c) Change of Environment According to Large-Scale MIMO Beamforming

When large-scale MIMO beamforming is performed, a gain reaches 10 dB or more. A change of a radio wave environment of a cellular system using the beamforming may be greater than a cellular system of the related art.

(d) Case in which Large-Scale MIMO Beamforming is Performed

For example, a base station of an urban area forming a beam directed toward a high-rise building is considered. In addition, even in a suburb, a base station of a small cell is considered to form a beam directed toward an area around the base station. A base station of a suburban macro cell is unlikely to perform large-scale MIMO beamforming.

(Measurement)

(a) CRS Measurement

In Long Term Evolution (LTE), a terminal device performs measurement of a cell-specific reference signal (CRS) transmitted by a base station. Specifically, the terminal device receives a CRS transmitted by a base station and thus performs measurement of quality of a propagation path between the base station and the terminal device. The measurement is referred to as "radio resource management (RRM) measurement," or is simply referred to as "measurement."

A result of the measurement is used to select a cell for a terminal device. As a specific example, the result of the measurement is used for cell selection/cell reselection by a terminal device that is in a radio resource control (RRC) idle (RRC Idle) state. In addition, for example, the result of the measurement is reported to a base station by a terminal device that is in an RRC connected state and is used for a handover decision by the base station.

As described above, measurement is performed by receiving a CRS. Since the CRS is a signal for measuring quality of a transmission path of omnidirectional radio waves, it is transmitted without beamforming. That is, the CRS is transmitted without multiplying the weight set for beamforming.

There is a reference signal for demodulation called a demodulation reference signal (DM-RS) or a UE-specific reference signal. Since the reference signal for demodulation is multiplied by the weight set for beamforming, it is not preferable to measure quality of a transmission path of omnidirectional radio waves. In addition, there is a reference signal called a channel state information reference signal (CSI-RS). Similarly to the CRS, the CSI-RS is transmitted without beamforming. However, since a transmission frequency of the CSI-RS is low, measurement by receiving the CSI-RS consumes much time. Hereinafter, a relation between multiplication of a weight coefficient and insertion (or mapping) of a reference signal will be described with reference to FIG. 2.

Figure 2:
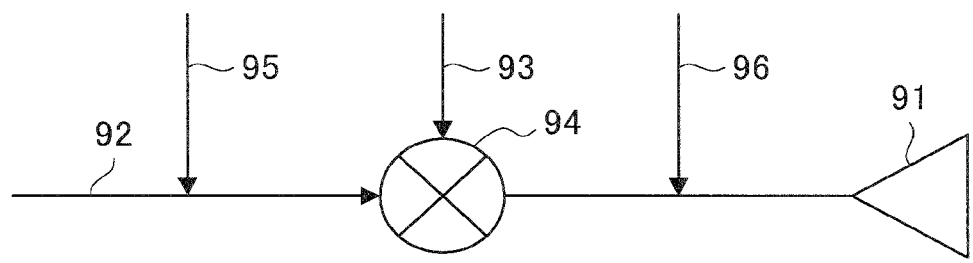
FIG. 2 is an explanatory diagram for describing a relation between multiplication of a weight coefficient and insertion of a reference signal.

FIG. 2 is an explanatory diagram for describing a relation between multiplication of a weight coefficient and insertion of a reference signal. Referring to FIG. 2, a transmission signal 92 corresponding to each antenna element 91 is complex-multiplied by a weight coefficient 93 in a multiplier 94. Then, the transmission signal 92 complex-multiplied by the weight coefficient 93 is transmitted from the antenna element 91. In addition, a DR-MS 95 is inserted before the multiplier 94, and the weight coefficient 93 is complex-multiplied in the multiplier 94. Then, the DR-MS 95 complex-multiplied by the weight coefficient 93 is transmitted from the antenna element 91. On the other hand, a CRS 96 (and CSI-RS) is inserted after the multiplier 94. Then, the CRS 96 (and CSI-RS) is transmitted from the antenna element 91 without being multiplied by the weight coefficient 93.

(b) RSRP and RSRQ

In LTE, CRS measurement is measurement of reference signal received power (RSRP) and/or reference signal received quality (RSRQ). In other words, a terminal device acquires RSRP and/or RSRQ as a result of the measurement of the CRS. The RSRQ is calculated from the RSRP and a received signal strength indicator (RSSI).

The RSRP is received power of a CRS for each single resource element. That is, the RSRP is an average value of received power of the CRS. The received power of the CRS is obtained by detecting a correlation between a reception signal in a resource element of the CRS and a known signal CRS. The RSRP corresponds to a desired signal "Signal (S)."

The RSSI is total power of signals for each Orthogonal Frequency Division Multiple Access (OFDMA) symbol. Therefore, the RSSI includes a desired signal, an interference signal and noise. That is, the RSSI corresponds to "Signal (S)+Interference (I)+Noise (N)."

The RSRQ is RSRP/(RSSI/N). N denotes the number of resource blocks used for calculating an RSSI. The resource blocks are resource blocks that are arranged in a frequency direction. Therefore, the RSRQ is a value that is obtained by dividing the RSRP using the RSSI for each resource block. That is, the RSRQ corresponds to a signal-to-interference-plus-noise ratio (SINR).

As described above, according to the measurement of the CRS, received power (that is, RSRP) and received quality (that is, RSRQ) such as an SINR are obtained.

(c) Effect of Averaging

In order to acquire the RSRP and the RSRQ, it is necessary to receive signals for several milliseconds to several tens of milliseconds and perform averaging of received power thereof. This is because, a result is likely to be influenced by an instantaneous variation of a channel such as fading when the RSRP and the RSRQ are acquired by averaging only one slot or one subset.

A technique of averaging is implemented for each terminal device and is not specifically defined in the specification.

(Cell Selection)

(a) Example of Cell Selection

For example, when a terminal device is in an RRC idle state, cell selection/cell reselection is performed. That is, the terminal device selects a cell for performing communication (for example, a cell for receiving paging).

In addition, for example, a base station performs a handover decision. That is, the base station selects a target cell for the terminal device and decides whether a handover from a serving cell for the terminal device to the target cell is performed.

In addition, for example, the base station adds a secondary cell (Scell) of carrier aggregation. The Scell is also called a secondary component carrier (SCC).

Here, the term "cell" may refer to a communication area of the base station or a frequency band that the base station uses. In addition, the term "cell" may refer to a primary cell (Pcell) or an Scell of carrier aggregation. The Pcell is also called a primary component carrier (PCC). The Scell is also called a secondary component carrier (SCC).

(b) Cell Selection when Beamforming is Performed

As described above, in the form of the technology called large-scale MIMO or massive MIMO, the base station performs beamforming using a directional antenna including multiple antenna elements (for example, about 100 antenna elements). In this case, the base station can change a direction of a beam in not only the horizontal direction but also the vertical direction. Therefore, as an example, when the base station forms a beam directed toward a position (for example, an upper floor of a high-rise building) higher than the base station, it is possible to increase throughput at the high position. As another example, when a small base station forms a beam toward a nearby area, it is possible to reduce interference with an adjacent base station.

Here, when transmission and reception of signals according to large-scale MIMO beamforming become a main flow, there is a question of whether cell selection may be performed based on the result of measurement of the CRS.

Specifically, only quality of a transmission path of omni-directional radio waves can be understood from measurement of the CRS. However, the transmission path of omni-directional radio waves is completely different from a transmission path of a sharp beam that is formed according to large-scale MIMO beamforming. Therefore, when transmission and reception of signals according to the beamforming are assumed, there is a possibility of an appropriate cell not being selected in cell selection based on the result of measurement of the CRS.

As an example, when a terminal device transmits and receives signals in a cell selected based on the result of measurement of the CRS, there is a possibility of a great amount of interference due to a sharp beam from an adjacent base station. As another example, even if a result of measurement of a CRS of a certain cell is more favorable than a result of measurement of a CRS of another cell, there is a possibility of communication quality of the other cell being more favorable than communication quality of the certain cell when beamforming is performed.

As described above, there is a possibility of an appropriate cell for a terminal device not being selected when beamforming is performed.

(c) Case in which Measurement of a CRS is not Preferable

As described above, for example, large-scale MIMO beamforming is considered to be performed by a base station of an urban area or a base station of a small cell. Therefore, it is not preferable for such base stations to perform cell selection based on measurement of a CRS.

2. SCHEMATIC CONFIGURATION OF COMMUNICATION SYSTEM

Figure 3:
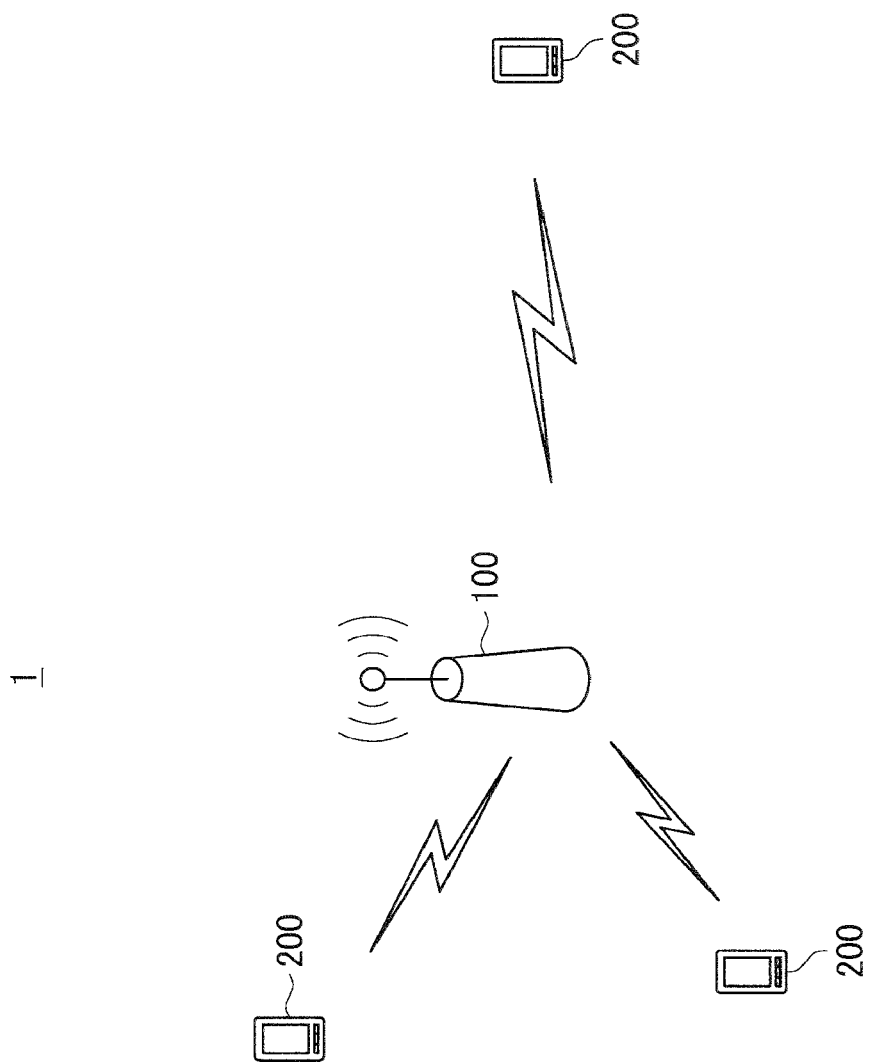
FIG. 3 is an explanatory diagram illustrating an example of a schematic configuration of a communication system according to an embodiment of the present disclosure.

Next, a schematic configuration of a communication system 1 according to an embodiment of the present disclosure will be described with reference to FIGS. 3 to 5. FIG. 3 is an explanatory diagram illustrating an example of the schematic configuration of the communication system 1 according to the embodiment of the present disclosure. Referring to FIG. 3, the communication system 1 includes a base station 100 and a terminal device 200. The communication system 1 is a system supporting, for example, LTE, LTE-Advanced, or a communication standard equivalent thereto.

(Base Station 100)

The base station 100 wirelessly communicates with a terminal device. For example, the base station 100 wirelessly communicates with a terminal device that is positioned within a communication area of the base station 100 (including, for example, the terminal device 200).

(Terminal Device 200)

The terminal device 200 wirelessly communicates with a base station. For example, when the terminal device 200 is positioned within the communication area of the base station 100 the terminal device 200 wirelessly communicates with the base station 100.

(Environment in which Beamforming is Performed)

Specifically, in an embodiment of the present disclosure, beamforming is performed by a base station. The base station includes, for example, the base station 100 and a neighbor base station of the base station 100. For example, the beamforming is large-scale MIMO beamforming. The beamforming may also be referred to as massive MIMO beamforming or three-dimensional beamforming.

As a specific example, the base station (for example, the base station 100 and the neighbor base station) includes a directional antenna capable of large-scale MIMO. In addition, the base station multiplies a transmission signal by a weight set for the directional antenna and thus performs large-scale MIMO beamforming. For example, the weight set is decided for each terminal device (for example, the terminal device 200). As a result, a beam directed toward the terminal device is formed. Hereinafter, an example of large-scale MIMO beamforming will be described with reference to FIG. 4 and FIG. 5.

Figure 4:
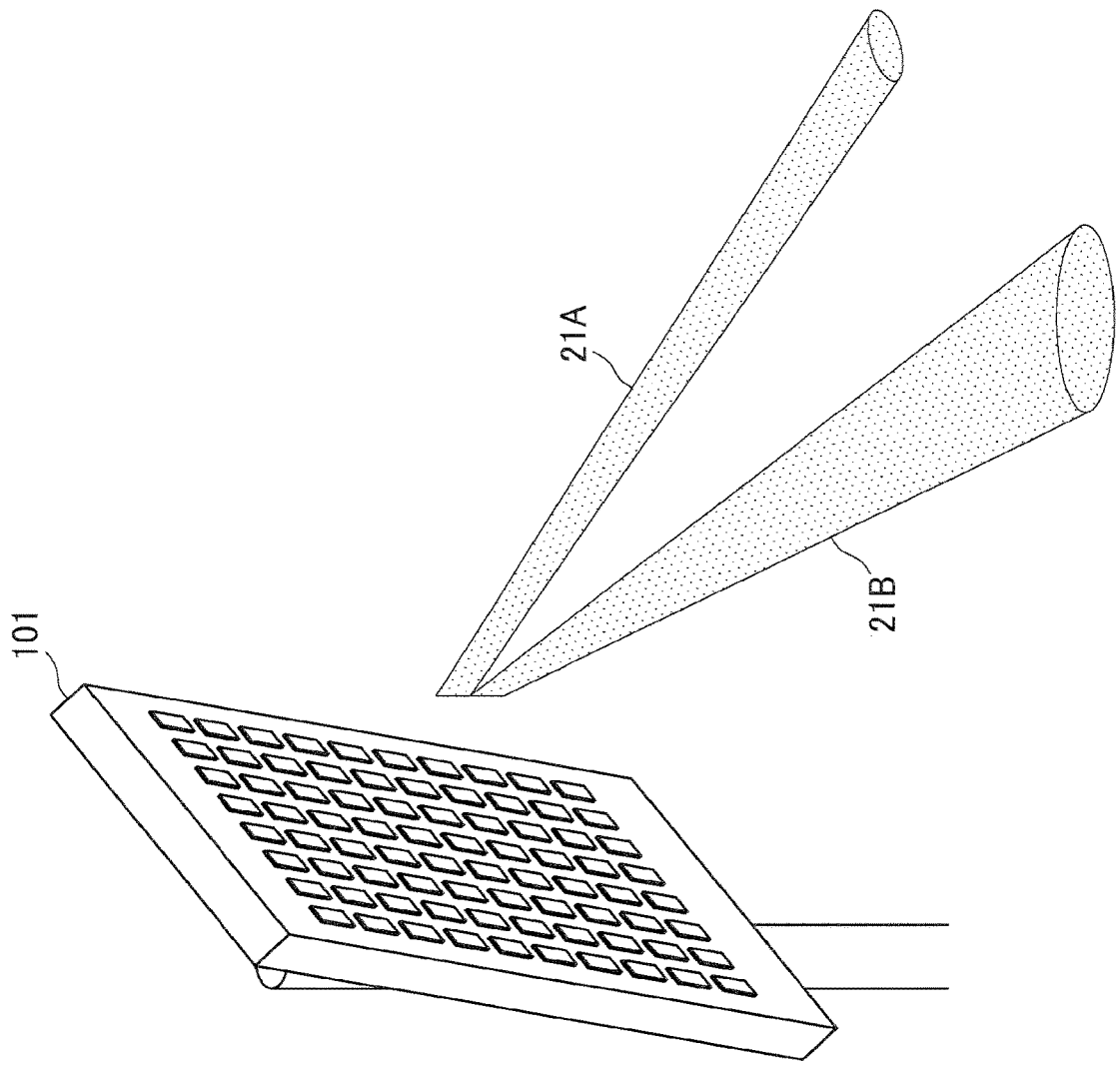
FIG. 4 is a first explanatory diagram for describing an example of large-scale MIMO beamforming.

FIG. 4 is a first explanatory diagram for describing an example of large-scale MIMO beamforming. Referring to FIG. 4, a directional antenna 101 available for large-scale MIMO is shown. The directional antenna 101 can form a sharp beam in a desired three-dimensional direction. For example, a beam 21A and a beam 21B are formed by the directional antenna 101.

Figure 5:
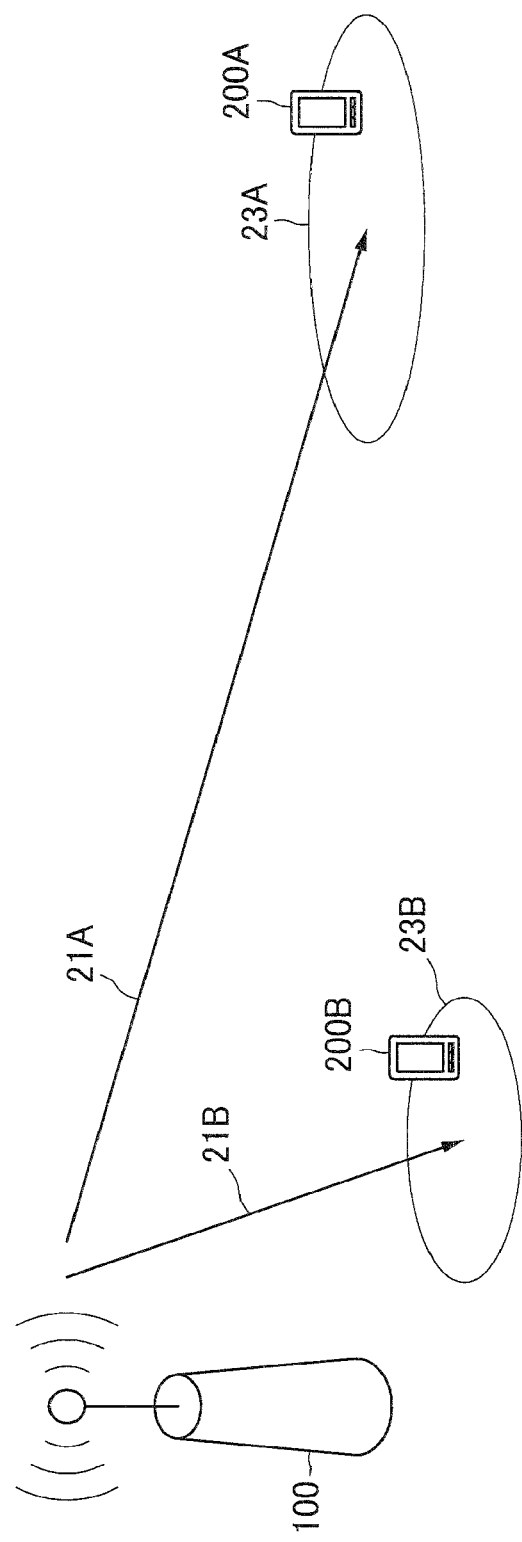
FIG. 5 is a second explanatory diagram for describing an example of large-scale MIMO beamforming.

FIG. 5 is a secondary explanatory diagram for describing an example of large-scale MIMO beamforming. Referring to FIG. 5, the beams 21A and 21B described with reference to FIG. 4 are shown. For example, the beam 21A reaches an area 23A and the beam 21B reaches an area 23B. Therefore, a terminal device 200A positioned within the area 23A can receive a signal transmitted as the beam 21A. In addition, a terminal device 200B positioned within the area 23B can receive a signal transmitted as the beam 21B. The base station 100 transmits a signal addressed to the terminal device 200A as the beam 21A and transmits a signal addressed to the terminal device 200B as the beam 21B.

The base station (for example, the base station 100 and the neighbor base station) can transmit, for example, a signal without beamforming. As an example, the base station includes an omnidirectional antenna and transmits a signal as omnidirectional radio waves. As another example, the base station includes a sector antenna and may transmit a signal as a sector beam.

3. FIRST EMBODIMENT

Next, a first embodiment of the present disclosure will be described with reference to FIG. 6 to FIG. 13.

In the first embodiment, a base station 100-1 performs cell selection for a terminal device 200-1 based on received quality information indicating received quality of a reference signal in the terminal device 200-1. Specifically, when a predetermined condition related to use of weight sets for beamforming by the base station is satisfied, the base station 100-1 does not perform the selection based on the received quality information.

Accordingly, for example, it is possible to select a cell that is more preferable for the terminal device 200-1 in an environment in which beamforming is performed.

<3.1. Configuration of Base Station>

Figure 6:
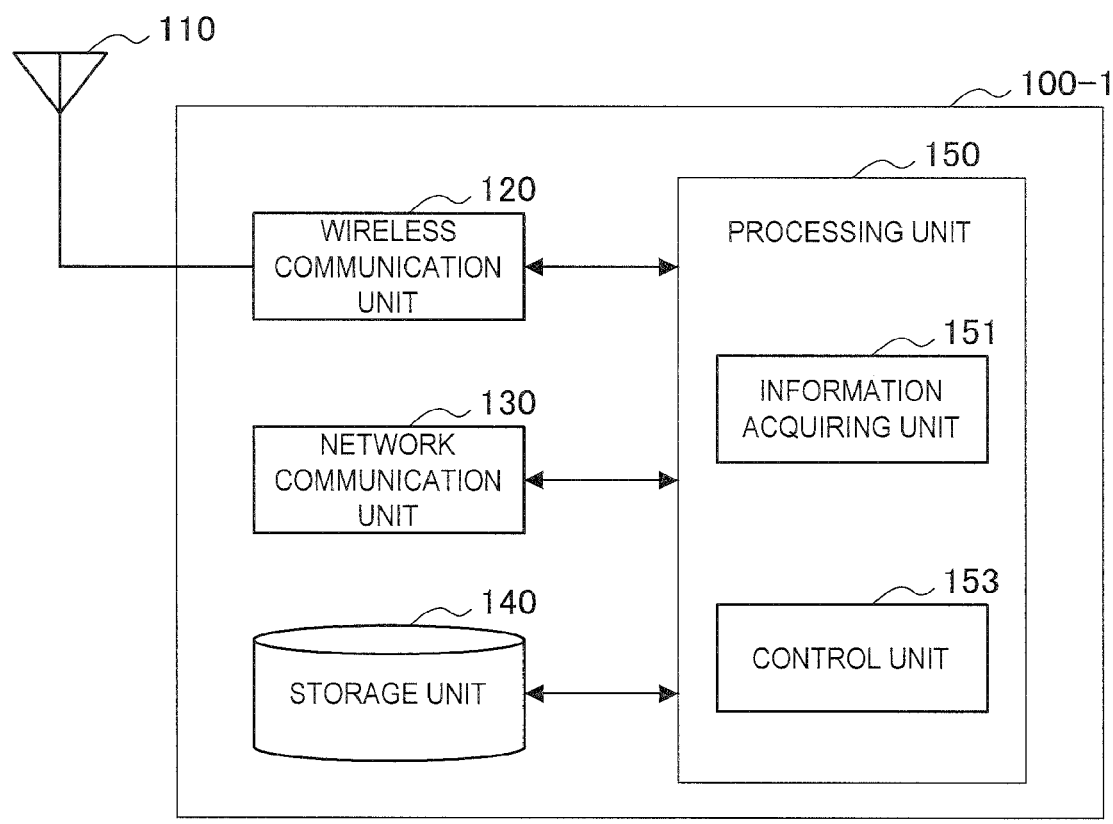
FIG. 6 is a block diagram illustrating an example of a configuration of a base station according to a first embodiment.

First, an example of a configuration of the base station 100-1 according to the first embodiment will be described with reference to FIG. 6 to FIG. 9. FIG. 6 is a block diagram illustrating an example of the configuration of the base station 100-1 according to the first embodiment. As illustrated in FIG. 6, the base station 100-1 includes an antenna unit 110, a wireless communication unit 120, a network communication unit 130, a storage unit 140 and a processing unit 150.

(Antenna unit 110)

The antenna unit 110 emits a signal output by the wireless communication unit 120 into space as radio waves. In addition, the antenna unit 110 converts spatial radio waves into a signal, and outputs the signal to the wireless communication unit 120.

For example, the antenna unit 110 includes a directional antenna. For example, the directional antenna is a directional antenna capable of large-scale MIMO.

In addition, for example, the antenna unit 110 further includes an omnidirectional antenna. Alternatively, the antenna unit 110 may include a sector antenna with or without an omnidirectional antenna.

(Wireless Communication Unit 120)

The wireless communication unit 120 transmits and receives signals. For example, the wireless communication unit 120 transmits a downlink signal to the terminal device 200-1 and receives an uplink signal from the terminal device 200-1.

(Network Communication Unit 130)

The network communication unit 130 transmits and receives information. For example, the network communication unit 130 transmits information to another node and receives information from the other node. For example, the other node includes another base station and a core network node.

(Storage Unit 140)

The storage unit 140 stores programs and data for operations of the base station 100-1.

(Processing Unit 150)

The processing unit 150 provides various functions of the base station 100-1. The processing unit 150 includes an information acquiring unit 151 and a control unit 153. Alternatively, the processing unit 150 may further include a component other than these components. That is, the processing unit 150 may also perform an operation other than operations of these components.

(Information Acquiring Unit 151)

The information acquiring unit 151 acquires received quality information indicating received quality of a reference signal in the terminal device 200-1.

(a) Received Quality

For example, the received quality is reference signal received quality (RSRQ). That is, the received quality information is information indicating RSRQ.

For example, the reference signal is a reference signal that is transmitted in a frequency band. The frequency band is, for example, a component carrier (CC) of carrier aggregation. For example, the reference signal is a cell-specific reference signal (CRS).

(b) Terminal Device

For example, the terminal device 200-1 is a terminal device that is connected to the base station 100-1.

(c) Acquiring Method

For example, the terminal device 200-1 measures received quality and reports received quality information indicating the received quality to the base station 100-1 as a measurement result. That is, the received quality information is information that is reported by the terminal device 200-1 to the base station 100-1 to which the terminal device 200-1 is connected. Then, the received quality information is stored in the storage unit 140. The information acquiring unit 151 acquires the received quality information from the storage unit 140 at any timing thereafter.

(Control Unit 153)

The control unit 153 performs cell selection for the terminal device 200-1 based on the received quality information. Specifically, in the first embodiment, when the predetermined condition related to the use of the weight sets for beamforming by the base station (hereinafter referred to as a "weight-use-related condition") is satisfied, the control unit 153 does not perform the selection based on the received quality information.

(a) Cell Selection

As a first example, the cell is a target cell of a handover of the terminal device 200-1. That is, the control unit 153 selects a target cell of the handover of the terminal device 200-1 based on the received quality information. Then, for example, the control unit 153 decides whether to perform the handover.

As a second example, the cell is a secondary cell of carrier aggregation for the terminal device 200-1. That is, the control unit 153 selects a secondary cell of carrier aggregation of the terminal device 200-1 based on the received quality information. Then, for example, the control unit 153 activates or deactivates the secondary cell.

(b) Weight-Use-Related Condition (b-1) Base Station

For example, the base station is the base station 100-1 to which the terminal device 200-1 is connected or a neighbor base station of the base station 100-1. That is, the weight-use-related condition is a predetermined condition related to use of a weight set by the base station 100-1 to which the terminal device 200-1 is connected or the neighbor base station of the base station 100-1.

(b-2) Weight Set for Beamforming

For example, a weight set used by the base station is a weight set for large-scale MIMO beamforming (or massive MIMO beamforming or three-dimensional beamforming).

Alternatively, the weight set used by the base station may be a weight set for an existing type of beamforming (for example, two-dimensional beamforming).

(b-3) Frequency Band

As described above, for example, the reference signal is a reference signal that is transmitted in a frequency band (for example, a CC). Thus, the weight-use-related condition is a condition related to use of the weight sets for beamforming by the base station in the frequency band (for example, the CC).

(b-4) First Example of Weight-Use-Related Condition (Change of Use Situation of Weight Set)

As a first example, the weight-use-related condition is a condition that a use situation of the weight sets for beamforming by the base station be changed by a predetermined degree or more. That is, when a use situation of weight sets by the base station (for example, the base station 100-1 or the neighbor base station) is changed by the predetermined degree or more, the control unit 153 does not perform the selection based on the received quality information.

Accordingly, for example, when a beam emitted by the base station is changed to some extent or more and reliability of the received quality information is decreased as a result, cell selection is not performed based on the received quality information. Therefore, a possibility of a cell that is not preferable for the terminal device 200-1 being selected may be decreased. In other words, a cell that is more preferable for the terminal device 200-1 may be selected.

Weight Set

Some of Weight Sets

For example, the weight-use-related condition is a condition that a use situation of some of the weight sets for beamforming by the base station be changed by the predetermined degree or more. That is, when the use situation of some of the weight sets for beamforming by the base station is changed by the predetermined degree or more, the control unit 153 does not perform the selection based on the received quality information. In other words, weight sets serving as targets of changes of use situations are some of the weight sets that are used by the base station.

As an example, some of the weight sets for beamforming may be weight sets that are used at a higher frequency (that is, weight sets used in more radio resources). As another example, some of the weight sets for beamforming may be weight sets except a weight set of a beam directed toward a central portion of a cell of the base station (for example, a weight set of a beam directed toward a cell edge).

All Weight Sets

The weight-use-related condition may be a condition that use situations of all of the weight sets for beamforming by the base station be changed by the predetermined degree or more. That is, when use situations of all of the weight sets for beamforming by the base station are changed by the predetermined degree or more, the control unit 153 may not perform the selection based on the received quality information. In other words, weight sets serving as targets of changes of use situations may be all of the weight sets that are used by the base station.

Change of Use Situation

Change of Weight Set to be Used

As a first specific example, the weight-use-related condition is a condition that the weight sets for beamforming used by the base station be changed by a predetermined degree or more. That is, when weight sets used by the base station (for example, the base station 100-1 or the neighbor base station) are changed by the predetermined degree or more, the control unit 153 does not perform the selection based on the received quality information.

For example, when a predetermined number or more weight sets among weight sets used by the base station are changed in a short period, the control unit 153 does not perform the selection based on the received quality information. Hereinafter, this will be described with reference to a specific example of FIG. 7.

Figure 7:
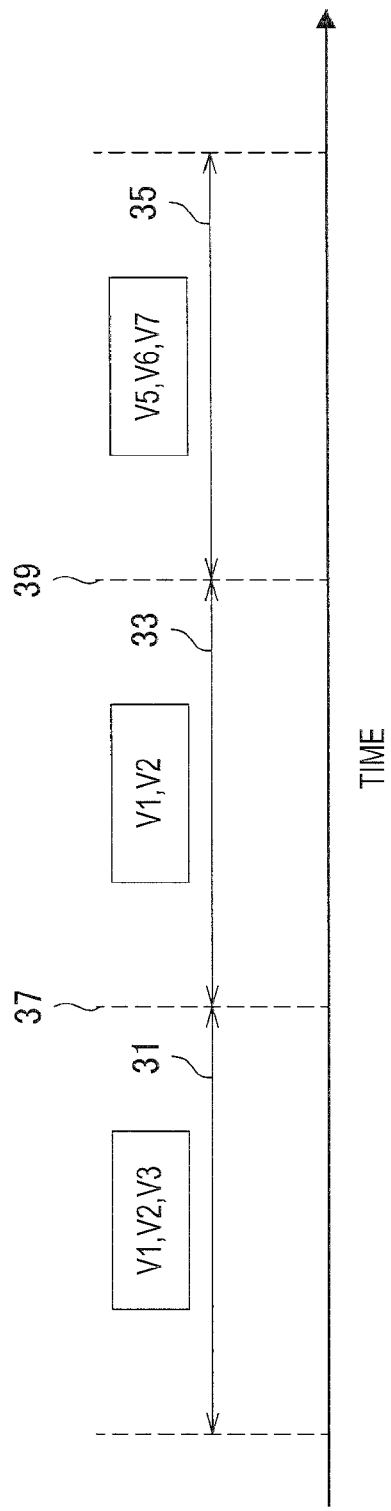
FIG. 7 is an explanatory diagram for describing an example of a change of weight sets that are used by a base station.

FIG. 7 is an explanatory diagram for describing an example of a change of weight sets used by a base station. Referring to FIG. 7, a period 31, a period 33 and a period 35 are shown. In this example, the base station transmits a signal using a weight set of V1, V2 and V3 in the period 31, transmits a signal using a weight set of V1 and V2 in the period 33, and transmits a signal using a weight set of V5, V6 and V7 in the period 35. That is, one weight set among weight sets used by the base station is changed at a time point 37, and three weight sets among the weight sets used by the base station are changed at a time point 39. For example, when two or more weight sets are changed in a short period, the control unit 153 does not perform measurement based on the received quality information. In this case, the control unit 153 determines that two or more weight sets are changed in a short period based on the change of weight sets at the time point 39 and does not perform cell selection for the terminal device 200-1 based on the received quality information.

It should be noted that a change of weight sets used by the base station by the predetermined degree or more is not limited to the above example (a change of the predetermined number or more weight sets). Various changes may be applied. As an example, a distance between weight set groups is defined, and when weight set groups used by the base station are changed by a predetermined distance or more in a short period, the control unit 153 may not perform the selection based on the received quality information.

For example, as described above, when weight sets used by the base station are changed by the predetermined degree or more, the control unit 153 does not perform the selection based on the received quality information. Accordingly, for example, when a direction of a beam emitted by the base station is changed to some extent or more and reliability of the received quality information is decreased as a result, cell selection is not performed based on the received quality information. Therefore, a possibility of a cell that is not preferable for the terminal device 200-1 being selected may be decreased.

Change of Use Frequency of Weight Sets

As a second specific example, the weight-use-related condition is a condition that a use frequency of the weight sets for beamforming by the base station be changed by a predetermined degree or more. That is, when a use frequency of weight sets by the base station (for example, the base station 100-1 or the neighbor base station) is changed by the predetermined degree or more, the control unit 153 does not perform the selection based on the received quality information.

For example, the use frequency is an amount or a ratio of radio resources through which the base station transmits a signal using a weight set for beamforming, and a predetermined frequency is a predetermined amount or ratio. That is, when an amount or a ratio of radio resources through which the base station (for example, the base station 100-1 or the neighbor base station) transmits a signal using a weight set is changed by a predetermined amount or a predetermined ratio or more, the control unit 153 does not perform the selection based on the received quality information. Hereinafter, this will be described with reference to a specific example of FIG. 8.

Figure 8:
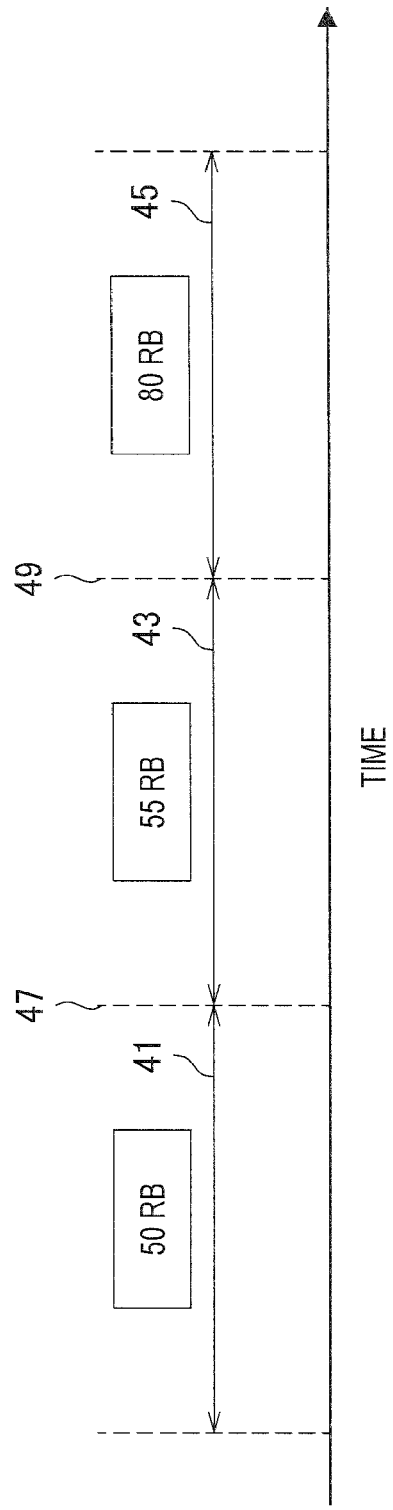
FIG. 8 is an explanatory diagram for describing an example of a change of a use frequency of weight sets by a base station.

FIG. 8 is an explanatory diagram for describing an example of a change of a use frequency of weight sets by a base station. Referring to FIG. 8, a period 41, a period 43 and a period 45 are shown. In this example, the base station transmits a signal using a weight set in 50 RBs (50%) among 100 resource blocks (RBs) across a component carrier (CC) having a bandwidth of 20 MHz in the period 41. Further, the base station transmits a signal using a weight set in 55 RBs (55%) in the period 43, and transmits a signal using a weight set in 80 RBs (80%) in the period 45. That is, the number of RBs through which a signal is transmitted using a weight set increases by 5 (5%) at a time point 47 and the number of RBs through which a signal is transmitted using a weight set increases by 25 (25%) at a time point 49. For example, when the number of RBs through which a signal is transmitted using a weight set increases or decreases by 20 (20%) in a short period, the control unit 153 does not perform measurement based on the received quality information. In this case, the control unit 153 determines that the number of RBs through which a signal is transmitted using a weight set is changed by 20 or more in a short period based on the change in the number of RBs at the time point 49 and does not perform cell selection for the terminal device 200-1 based on the received quality information.

Accordingly, for example, when an amount of beams emitted by the base station is changed to some extent or more and reliability of the received quality information decreases as a result, cell selection is not performed based on the received quality information. Therefore, a possibility of a cell that is not preferable for the terminal device 200-1 being selected may be decreased Cell Selection after Change For example, after the weight-use-related condition is satisfied, the control unit 153 does not perform the selection based on the received quality information for a predetermined period. In addition, for example, the control unit 153 performs the selection based on the received quality information after the predetermined period has elapsed.

Accordingly, for example, cell selection is not performed based on received quality information having low reliability immediately after a beam emitted by the base station is changed. Then, after a while from when the beam is changed, cell selection may be performed based on received quality information indicating received quality in an environment of the changed beam (that is, received quality information having high reliability). Therefore, a cell that is more preferable for the terminal device 200-1 may be selected.

Learning about Use Situation of Weight Set

For example, the control unit 153 can identify the use situation of the weight sets for beamforming by the base station 100-1. Therefore, the control unit 153 can determine whether the weight-use-related condition for the base station 100-1 is satisfied.

For example, a neighbor base station notifies the base station 100-1 of information about a use situation of the weight sets for beamforming by the neighbor base station of the base station 100-1. The neighbor base station may notify the base station 100-1 that the use situation is changed by the predetermined degree or more or notify the base station 100-1 of the use situation itself (for example, a weight set to be used or a use frequency of weight sets). Therefore, the control unit 153 can determine whether the weight-use-related condition for the neighbor base station is satisfied.

For example, the base station 100-1 notifies the neighbor base station of the base station 100-1 of information about the use situation of the weight sets for beamforming by the base station 100-1. The base station 100-1 may notify the neighbor base station that the use situation is changed by the predetermined degree or more or may notify the neighbor base station of the use situation itself. Accordingly, for example, the neighbor base station can determine whether the weight-use-related condition for the base station 100-1 is satisfied.

(b-5) Second Example of Weight-Use-Related Condition (Use Frequency of Weight Sets)

As a second example, the weight-use-related condition is a condition that a use frequency of the weight sets for beamforming by the base station be equal to or greater than the predetermined frequency. That is, when the use frequency of the weight sets for beamforming by the base station is equal to or greater than the predetermined frequency, the control unit 153 does not perform the selection based on the received quality information.

Weight Set

Some of Weight Sets

For example, the weight-use-related condition is a condition that a use frequency of some of the weight sets for beamforming by the base station be equal to or greater than the predetermined frequency. That is, when the use frequency of some of the weight sets for beamforming by the base station is equal to or greater than the predetermined frequency, the control unit 153 does not perform the selection based on the received quality information. In other words, weight sets serving as targets of a use frequency are some of weight sets that are used by the base station.

As an example, some of the weight sets for beamforming may be weight sets that are used at a higher frequency (that is, weight sets used for more radio resources). As another example, some of the weight sets for beamforming may be weight sets except a weight set of a beam directed toward a central portion of a cell of the base station (for example, a weight set of a beam directed toward a cell edge).

All Weight Sets

The weight-use-related condition is a condition that a use frequency of all of the weight sets for beamforming by the base station be equal to or greater than the predetermined frequency. That is, when the use frequency of all of the weight sets for beamforming by the base station is equal to or greater than the predetermined frequency, the control unit 153 may not perform the selection based on the received quality information. In other words, weight sets serving as targets of a use frequency may be all weight sets used by the base station.

Accordingly, for example, when an amount of beams emitted by the base station is an amount of some extent or more, received quality is greatly influenced by the beams and reliability of the received quality information decreases as a result so that cell selection is not performed based on the received quality information. Therefore, a possibility of a cell that is not preferable for the terminal device 200-1 being selected may be decreased. In other words, a cell that is more preferable for the terminal device 200-1 may be selected.

Use Frequency of Weight Sets

For example, the use frequency is an amount or a ratio of radio resources through which the base station transmits a signal using a weight set for beamforming, and the predetermined frequency is a predetermined amount or ratio. That is, when an amount or a ratio of radio resources through which the base station transmits a signal using a weight set for beamforming is equal to or greater than the predetermined amount or ratio, the control unit 153 does not perform the selection based on the received quality information. Hereinafter, this will be described with reference to a specific example of FIG. 9.

Figure 9:
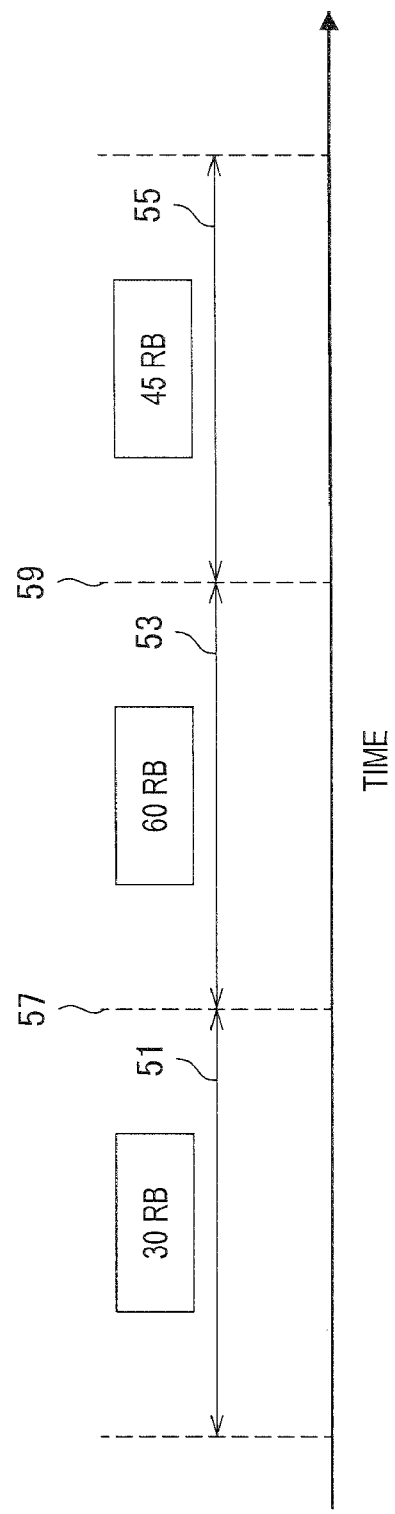
FIG. 9 is an explanatory diagram for describing an example of a use frequency of weight sets by a base station.

FIG. 9 is an explanatory diagram for describing an example of a use frequency of weight sets by a base station. Referring to FIG. 8, a period 51, a period 53 and a period 55 are shown. In this example, the base station transmits a signal using a weight set in 30 RBs (30%) among 100 RBs across a CC having a bandwidth of 20 MHz in the period 51. Further, the base station transmits a signal using a weight set in 60 RBs (60%) in the period 53, and transmits a signal using a weight set in 45 RBs (45%) in the period 55. For example, when a signal is transmitted using a weight set in 50 RBs (50%) or more, the control unit 153 does not perform measurement based on the received quality information. In this case, the control unit 153 determines that a signal is transmitted using a weight set in 50 RBs or more in the period 53 and does not perform cell selection for the terminal device 200-1 based on the received quality information. In addition, the control unit 153 determines that a signal is not transmitted using a weight set in 50 RBs (50%) or more in the period 51 and the period 53 and performs cell selection for the terminal device 200-1 based on the received quality information.

Learning about Use Frequency of Weight Sets

For example, the control unit 153 can identify a use frequency of the weight sets for beamforming by the base station 100-1. Therefore, the control unit 153 can determine whether the weight-use-related condition for the base station 100-1 is satisfied.

For example, a neighbor base station notifies the base station 100-1 of information about a use frequency of the weight sets for beamforming by the neighbor base station of the base station 100-1. The neighbor base station may notify the base station 100-1 that the use frequency is equal to or greater than the predetermined frequency or may notify the base station 100-1 of the use frequency itself. Therefore, the control unit 153 can determine whether the weight-use-related condition for the neighbor base station is satisfied.

For example, the base station 100-1 notifies the neighbor base station of the base station 100-1 of information about the use frequency of the weight sets for beamforming by the base station 100-1. The base station 100-1 may notify the neighbor base station that the use frequency is equal to or greater than the predetermined frequency or may notify the neighbor base station of the use frequency itself. Accordingly, for example, the neighbor base station can determine whether the weight-use-related condition for the base station 100-1 is satisfied.

(b-6) Operation when Weight-Use-Related Condition is Satisfied

As described above, when the weight-use-related condition is satisfied, the control unit 153 does not perform the selection based on the received quality information. When the use-related condition is satisfied, the control unit 153 may not perform the selection itself or may perform the selection based on information other than the received quality information (for example, received power information such as RSRP).

<3.2. Process Flow>

Next, examples of processes according to the first embodiment will be described with reference to FIG. 10 to FIG. 13.

(Case of First Example of Weight-Use-Related Condition)

First, a process related to a case in which a first example of the weight-use-related condition is applied will be described. The first example of the weight-use-related condition is a condition that a use situation of the weight sets for beamforming by the base station be changed by a predetermined degree or more.

(a) Cell Selection Process

Figure 10:
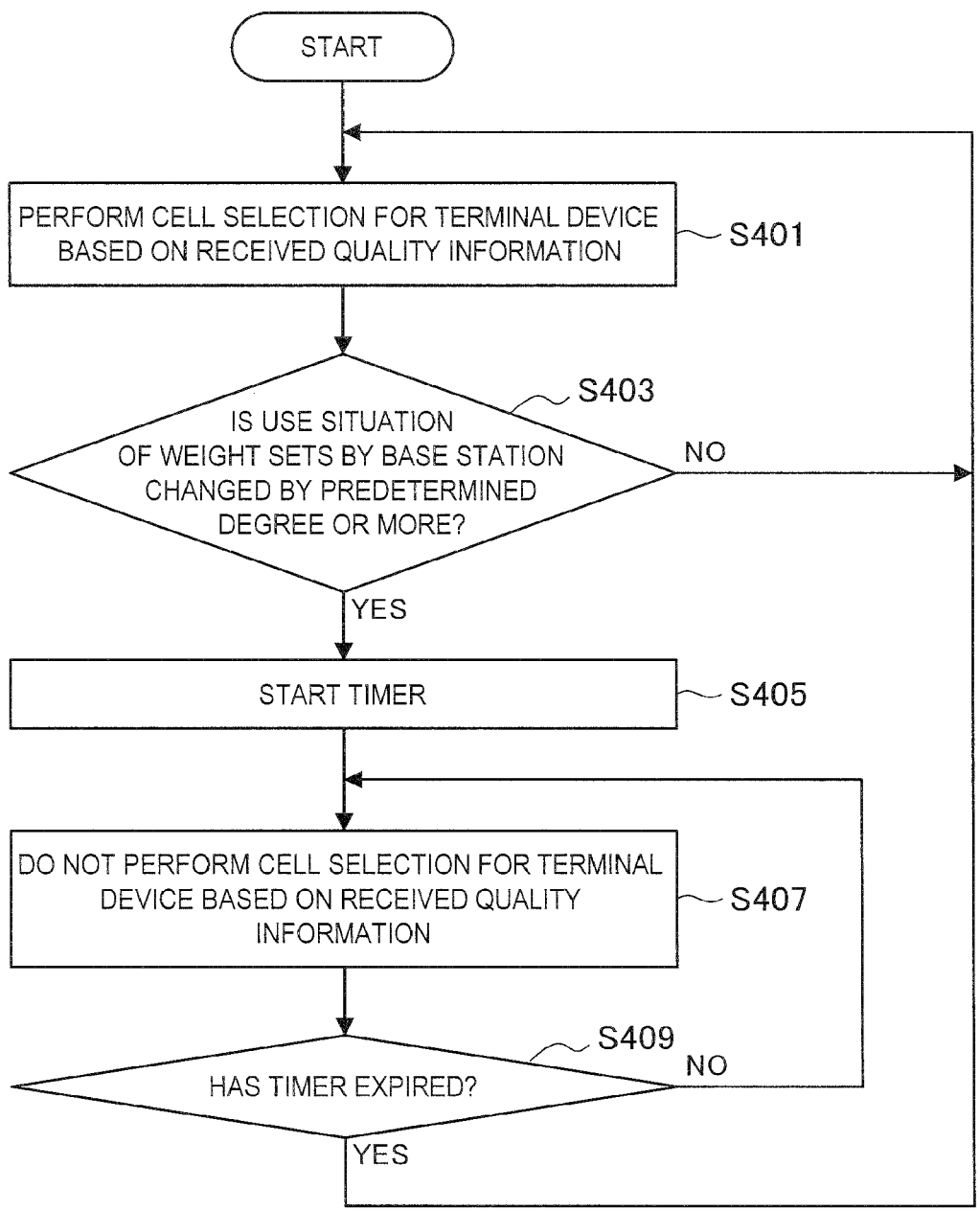
FIG. 10 is a flowchart illustrating a first example of a schematic flow of a cell selection process according to the first embodiment.

FIG. 10 is a flowchart illustrating a first example of a schematic flow of a cell selection process according to the first embodiment.

The information acquiring unit 151 acquires received quality information indicating received quality of a reference signal in the terminal device 200-1, and the control unit 153 performs cell selection for the terminal device 200-1 based on the received quality information (S401).

The control unit 153 determines whether a use situation of weight sets by the base station (for example, the base station 100-1 or a neighbor base station) is changed by a predetermined degree or more (S403) When the use situation is not changed by the predetermined degree or more, the process returns to Step S401.

When the use situation is changed by the predetermined degree or more, the control unit 153 starts a timer (S405).

Then, the control unit 153 does not perform cell selection for the terminal device 200-1 based on the received quality information (S407). This continues as long as the timer has not expired (NO in S409). That is, the control unit 153 does not perform the selection based on the received quality information for a predetermined period.

When the timer expires (YES in S409), the process returns to Step S401.

(b) Notification Process

Figure 11:
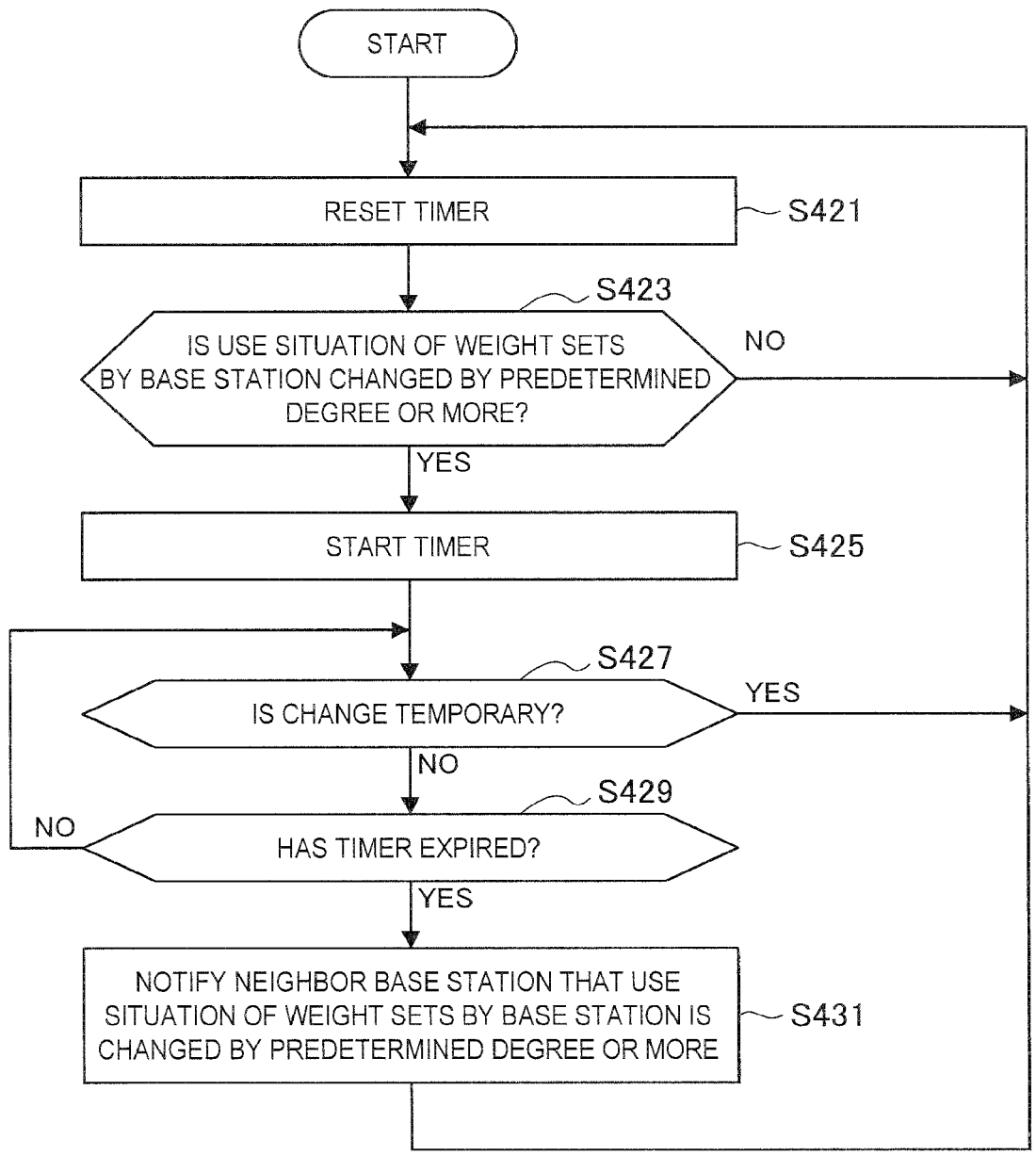
FIG. 11 is a flowchart illustrating a first example of a schematic flow of a notification process according to the first embodiment.

FIG. 11 is a flowchart illustrating a first example of a schematic flow of a notification process according to the first embodiment.

The control unit 153 resets a timer (S421) It is determined whether a use situation of weight sets by the base station 100-1 is changed by a predetermined degree or more (S423). When the use situation is not changed by the predetermined degree or more (NO in S423), the process returns to Step S421.

When the use situation is changed by the predetermined degree or more (YES in S423), the control unit 153 starts the timer (S425).

Then, the control unit 153 determines whether a change of the use situation is temporary (S427). That is, the control unit 153 determines whether the use situation is returned to its origin. The determination continues as long as the timer has not expired (NO in S429). When the change of the use situation is temporary (YES in S427), the process returns to Step S421.

When the timer expires (YES in S429), the control unit 153 notifies a neighbor base station of the base station 100-1 that the use situation of the weight sets by the base station 100-1 is changed by the predetermined degree or more (S431). Then, the process returns to Step S421.

(Case of Second Example of Weight-Use-Related Condition)

Next, a process related to a case in which a second example of the weight-use-related condition is applied will be described. The second example of the weight-use-related condition is a condition that a use frequency of the weight sets for beamforming by the base station be equal to or greater than a predetermined frequency.

(a) Cell Selection Process

Figure 12:
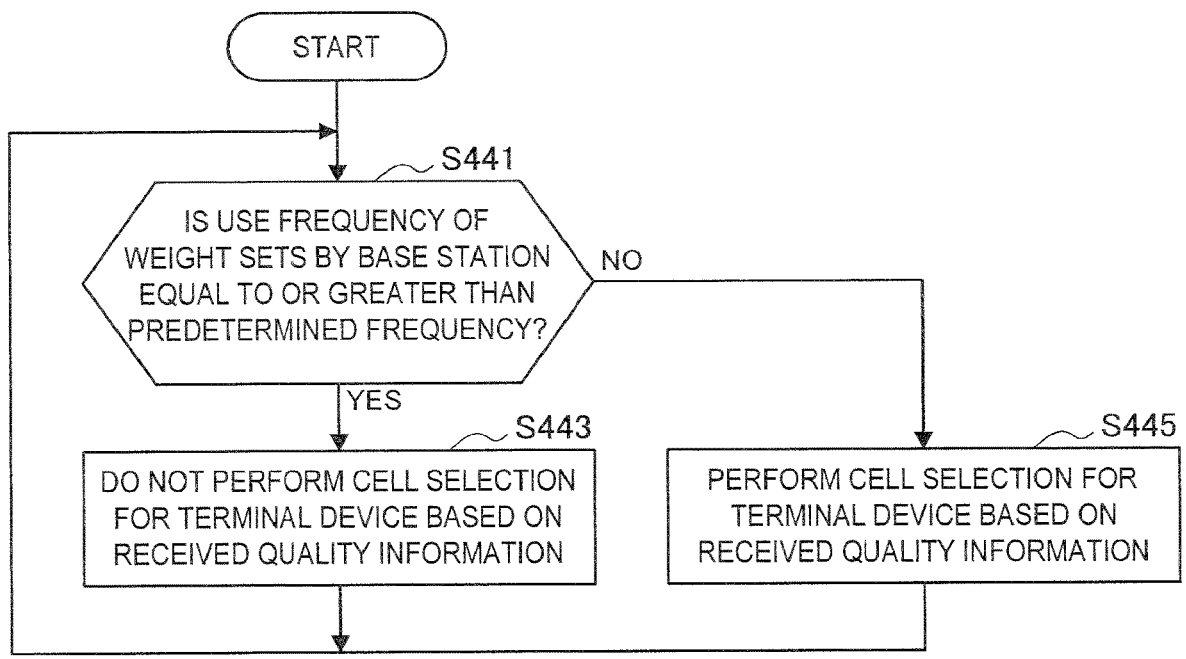
FIG. 12 is a flowchart illustrating a second example of a schematic flow of a cell selection process according to the first embodiment.

FIG. 12 is a flowchart illustrating a second example of a schematic flow of a cell selection process according to the first embodiment.

The control unit 153 determines whether a use frequency of weight sets by a base station (for example, the base station 100-1 or a neighbor base station) is equal to or greater than a predetermined frequency (S441).

When the use frequency use situation is equal to or greater than the predetermined frequency (YES in S441), the control unit 153 does not perform cell selection for the terminal device 200-1 based on received quality information (S443). Then, the process returns to Step S441.

When the use frequency use situation is less than the predetermined frequency (NO in S441), the information acquiring unit 151 acquires received quality information indicating received quality of a reference signal in the terminal device 200-1 and the control unit 153 performs cell selection for the terminal device 200-1 based on the received quality information (S445). Then, the process returns to Step S441.

(b) Notification Process

Figure 13:
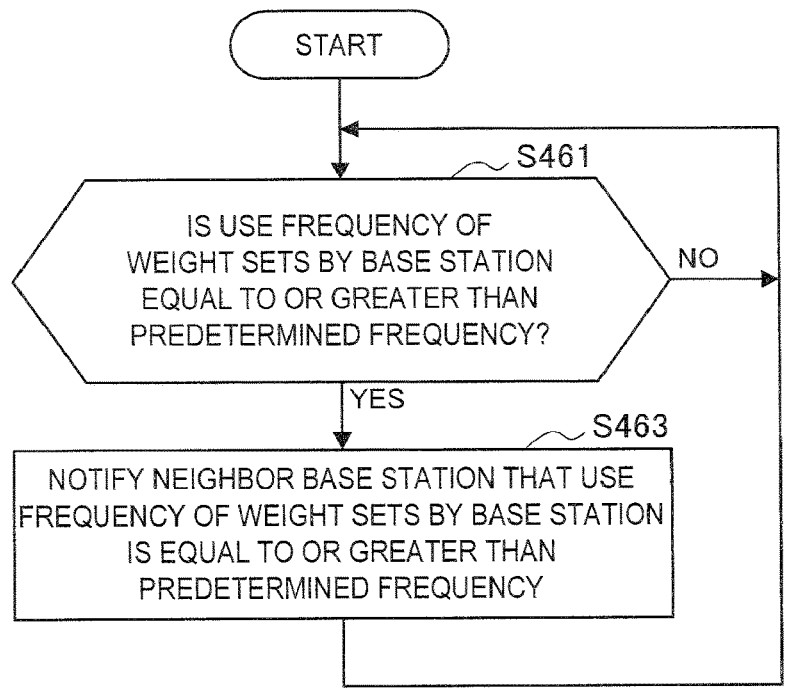
FIG. 13 is a flowchart illustrating a second example of a schematic flow of a notification process according to the first embodiment.

FIG. 13 is a flowchart illustrating a second example of a schematic flow of a notification process according to the first embodiment.

The control unit 153 determines whether a use frequency of weight sets by the base station 100-1 is equal to or greater than a predetermined frequency (S461).

When the use frequency use situation is equal to or greater than the predetermined frequency (YES in S461), the control unit 153 notifies a neighbor base station of the base station 100-1 that the use frequency of the weight sets by the base station 100-1 is equal to or greater than the predetermined frequency (S463). Then, the process returns to Step S461.

4. SECOND EMBODIMENT

Figure 14:
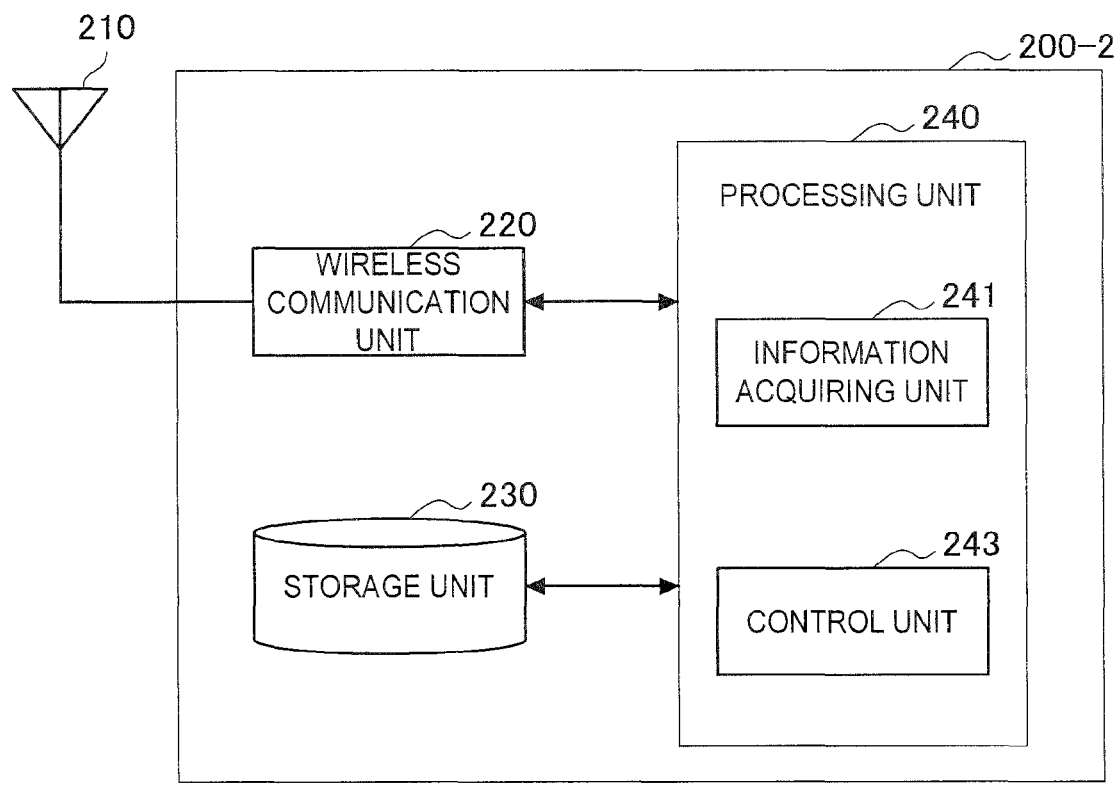
FIG. 14 is a block diagram illustrating an example of a configuration of a terminal device according to a second embodiment.

Next, a second embodiment of the present disclosure will be described with reference to FIG. 14.

In the second embodiment, a terminal device 200-2 performs cell selection for the terminal device 200-2 based on received quality information indicating received quality of a reference signal in the terminal device 200-2. When predetermined condition related to the use of weight sets for beamforming by the base station is satisfied, the terminal device 200-2 does not perform the selection based on the received quality information. That is, while a subject is the base station 100-1 in the first embodiment, a subject is the terminal device 200-2 in the second embodiment.

Accordingly, for example, it is possible to select a cell that is more preferable for the terminal device 200-2 in an environment in which beamforming is performed.

<4.1. Configuration of Terminal Device>

First, an example of a configuration of the terminal device 200-2 according to the second embodiment will be described with reference to FIG. 14. FIG. 14 is a block diagram illustrating an example of a configuration of the terminal device 200-2 according to the second embodiment. As illustrated in FIG. 14, the terminal device 200-2 includes an antenna unit 210, a wireless communication unit 220, a storage unit 230 and a processing unit 240.

(Antenna Unit 210)

The antenna unit 210 emits a signal to be output by the wireless communication unit 220 into space as radio waves. In addition, the antenna unit 210 converts spatial radio waves into a signal and outputs the signal to the wireless communication unit 220.

(Wireless Communication Unit 220)

The wireless communication unit 220 transmits and receives signals. For example, the wireless communication unit 220 receives a downlink signal from the base station 100-2 and transmits an uplink signal to the base station 100-2.

(Storage Unit 230)

The storage unit 230 stores programs and data for operations of the terminal device 200-2.

(Processing Unit 240)

The processing unit 240 provides various functions of the terminal device 200-2. The processing unit 240 includes an information acquiring unit 241 and a control unit 243. Alternatively, the processing unit 240 may further include a component other than these components. That is, the processing unit 240 may also perform an operation other than operations of these components.

(Information Acquiring Unit 241)

The information acquiring unit 241 acquires received quality information indicating received quality of a reference signal in the terminal device 200-2.

(a) Received Quality

For example, the received quality is RSRQ. That is, the received quality information is information indicating RSRQ.

For example, the reference signal is a reference signal that is transmitted in a frequency band. The frequency band is, for example, a CC of carrier aggregation. For example, the reference signal is a CRS.

(b) Acquiring Method

For example, the terminal device 200-2 (the processing unit 240) measures the received quality and stores received quality information indicating the received quality in the storage unit 230. The information acquiring unit 241 acquires the received quality information from the storage unit 230 at any timing thereafter.

(Control Unit 243)

The control unit 243 performs cell selection for the terminal device 200-2 based on the received quality information. Specifically, in the second embodiment, when the predetermined condition related to the use of the weight sets for beamforming by the base station (that is, a weight-use-related condition) is satisfied, the control unit 243 does not perform the selection based on the received quality information.

(a) Cell Selection

For example, the selection is cell selection or cell reselection by the terminal device 200-2. For example, when the terminal device 200-2 is in an idle state, the control unit 243 performs cell selection or cell reselection.

(b) Weight-Use-Related Condition

There is no difference in descriptions of the weight-use-related condition between the first embodiment and the second embodiment except learning about a use situation of weight sets and learning about a use frequency of weight sets. Therefore, redundant descriptions will be omitted here. Only learning about the use situation of the weight sets and learning about the use frequency of the weight sets in the second embodiment will be described.

(b-4) First Example of Weight-Use-Related Condition (Change of Use Situation of Weight Sets)

As a first example, the weight-use-related condition is a condition that a use situation of the weight sets for beamforming by the base station be changed by a predetermined degree or more. That is, when the use situation of the weight sets by the base station is changed by the predetermined degree or more, the control unit 243 does not perform the selection based on the received quality information.

Learning about Use Situation of Weight Sets

For example, the base station 100-2 notifies the terminal device 200-2 of information about the use situation of the weight sets for beamforming by the base station (the base station 100-2 or a neighbor base station of the base station 100-2). The base station 100-2 may notify the terminal device 200-2 that the use situation is changed by the predetermined degree or more or may notify the terminal device 200-2 of the use situation itself (for example, a weight set to be used or a use frequency of weight sets). Therefore, the control unit 243 can determine whether the weight-use-related condition for the base station is satisfied.

(b-5) Second Example of Weight-Use-Related Condition (Use Frequency of Weight Sets)

As a second example, the weight-use-related condition is a condition that a use frequency of the weight sets for beamforming by the base station be a predetermined frequency or more. That is, when the use frequency of the weight sets for beamforming by the base station is equal to or greater than the predetermined frequency, the control unit 243 does not perform the selection based on the received quality information.

Learning about Use Frequency of Weight Sets

For example, the base station 100-2 notifies the terminal device 200-2 of information about the use frequency of the weight sets for beamforming by the base station (the base station 100-2 or a neighbor base station of the base station 100-2). The base station 100-2 may notify the terminal device 200-2 that the use frequency is changed by the predetermined degree or more or may notify the terminal device 200-2 of the use frequency itself. Therefore, the control unit 243 can determine whether the weight-use-related condition for the base station is satisfied.

(c) Others (Measurement Reporting)

When the weight-use-related condition is satisfied, the control unit 243 may not report the received quality information to the terminal device 200-2. Accordingly, for example, radio resources may be saved since reporting of received quality information having low reliability is suppressed.

<4.2. Process Flow>

There is no difference in descriptions of a cell selection process of the terminal device 200-2 according to the second embodiment except a subject (that is, except that the base station 100-1 is a subject in the first embodiment and the terminal device 200-2 is a subject in the second embodiment) between the first embodiment and the second embodiment. Therefore, redundant descriptions will be omitted here. In the second embodiment, "the information acquiring unit 151" is replaced by "the information acquiring unit 241" and "the control unit 153" is replaced by "the control unit 243."

The second embodiment has been described above. The base station 100-2 according to the second embodiment may operate in the same manner as the base station 100-1 according to the first embodiment.

5. THIRD EMBODIMENT

Figure 15:
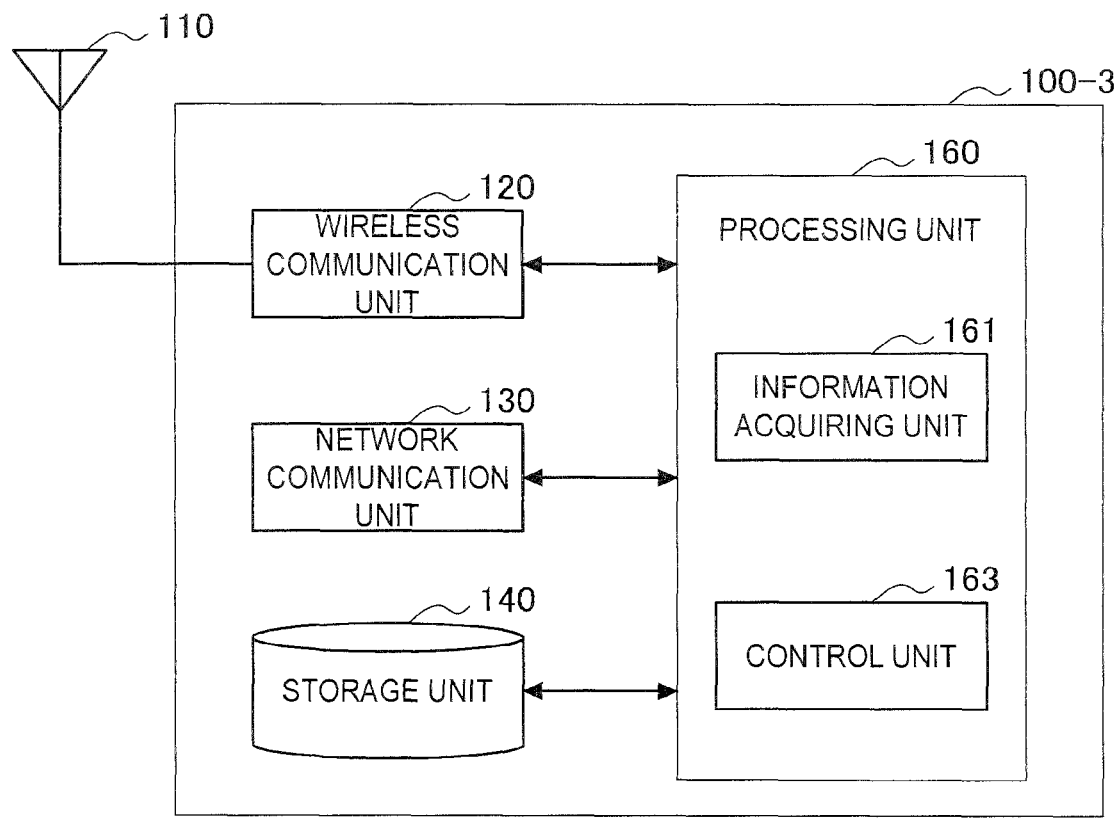
FIG. 15 is a block diagram illustrating an example of a configuration of a base station according to the third embodiment.

Next, a third embodiment of the present disclosure will be described with reference to FIG. 15 to FIG. 17.

In the third embodiment, a base station 100-3 transmits a signal using one or more weight sets for beamforming. Specifically, the base station 100-3 uses the one or more weight sets to transmit a signal in limited radio resources.

Accordingly, for example, it is possible to select a cell that is more preferable for the terminal device 200-3 in an environment in which beamforming is performed.

<5.1. Configuration of Base Station>

First, an example of a configuration of the base station 100-3 according to the third embodiment will be described with reference to FIG. 15 and FIG. 16. FIG. 15 is a block diagram illustrating an example of a configuration of the base station 100-3 according to the third embodiment. As illustrated in FIG. 15, the base station 100-3 includes the antenna unit 110, the wireless communication unit 120, the network communication unit 130, the storage unit 140 and a processing unit 160.

There is no difference in descriptions of the antenna unit 110, the wireless communication unit 120, the network communication unit 130 and the storage unit 140 between the first embodiment and the third embodiment except for different reference numerals. Therefore, redundant descriptions will be omitted here, and only the processing unit 160 will be described.

(Processing Unit 160)

The processing unit 160 provides various functions of the base station 100-3. The processing unit 160 includes an information acquiring unit 161 and a control unit 163. The processing unit 160 may further include a component other than these components. That is, the processing unit 160 may also perform an operation other than operations of these components.

(Information Acquiring Unit 161)

The information acquiring unit 161 acquires one or more weight sets for beamforming.

For example, the beamforming is large-scale MIMO beamforming. The beamforming may also be referred to as massive MIMO beamforming or three-dimensional beamforming.

For example, the one or more weight sets are stored in the storage unit 140. The information acquiring unit 161 acquires the one or more weight sets from the storage unit 140.

(Control Unit 163)

The control unit 163 controls wireless communication by the base station 100-3 such that the base station 100-3 transmits a signal using the one or more weight sets Specifically, in the third embodiment, the control unit 163 controls the wireless communication such that the one or more weight sets are used to transmit a signal in limited radio resources.

(a) Specific Process

For example, the control unit 163 controls the wireless communication by multiplying a signal by the one or more weight sets.

More specifically, for example, the control unit 163 multiplies a signal transmitted in the limited radio resources by the one or more weight sets and does not multiply a signal transmitted in other radio resources by the one or more weight sets.

(b) Limited Radio Resources

(b-1) First Example

As a first example, the limited radio resources are radio resources of a predetermined amount or a predetermined ratio or less. That is, the control unit 163 controls the wireless communication such that the one or more weight sets are used to transmit a signal in radio resources of the predetermined amount or the predetermined ratio or less. In other words, the control unit 163 controls the wireless communication such that the one or more weight sets are used at a predetermined frequency or less.

For example, the limited radio resources are radio resources of the predetermined amount or the predetermined ratio or less among radio resources of frequency bands. More specifically, for example, the limited radio resources are resource blocks of a predetermined amount or a predetermined ratio or less among resource blocks of a component carrier (CC). That is, the control unit 163 controls the wireless communication such that the one or more weight sets are used to transmit a signal in resource blocks of the predetermined amount or the predetermined ratio or less among resource blocks of CCs.

As an example, the limited radio resources are resource blocks of a predetermined amount or a predetermined ratio or less among resource blocks arranged in a frequency direction across a CC. As a specific example, the limited radio resources are 20 resource blocks or less (20% resource blocks or less) among 100 resource blocks arranged in the frequency direction across a CC of 20 MHz.

As another example, the limited radio resources may be resource blocks of a predetermined amount or a predetermined ratio or less among resource blocks for each predetermined period of a CC. Specifically, the limited radio resources may be 40 resource blocks or less (20% resource blocks or less) among 200 resource blocks for each subframe of the CC of 20 MHz. Alternatively, the limited radio resources may be 400 resource blocks or less (20% resource blocks or less) among 2000 resource blocks for each radio frame (that is, 10 subframes) for the CC of 20 MHz.

Accordingly, for example, an amount of beams emitted by the base station 100-3 is suppressed. As a result, a variation of received quality (for example, RSRQ) in the terminal device 200-3 is reduced. As a result, a decrease in reliability of the received quality information is suppressed. Therefore, a cell that is more preferable for the terminal device 200-3 may be selected.

(b-2) Second Example

As a second example, the limited radio resources are radio resources of some bands among frequency bands, and the some bands are bands other than a predetermined band among the frequency bands. That is, the control unit 163 controls the wireless communication such that the one or more weight sets are used to transmit a signal in radio resources of some bands (bands other than the predetermined band) among frequency bands.

More specifically, for example, the limited radio resources are radio resources of some bands (bands other than the predetermined band) among component carriers (CCs) That is, the control unit 163 controls the wireless communication such that the one or more weight sets are used to transmit a signal in radio resources of some bands (bands other than the predetermined band) among the CCs. Hereinafter, this will be described with reference to a specific example of FIG. 16.

Figure 16:
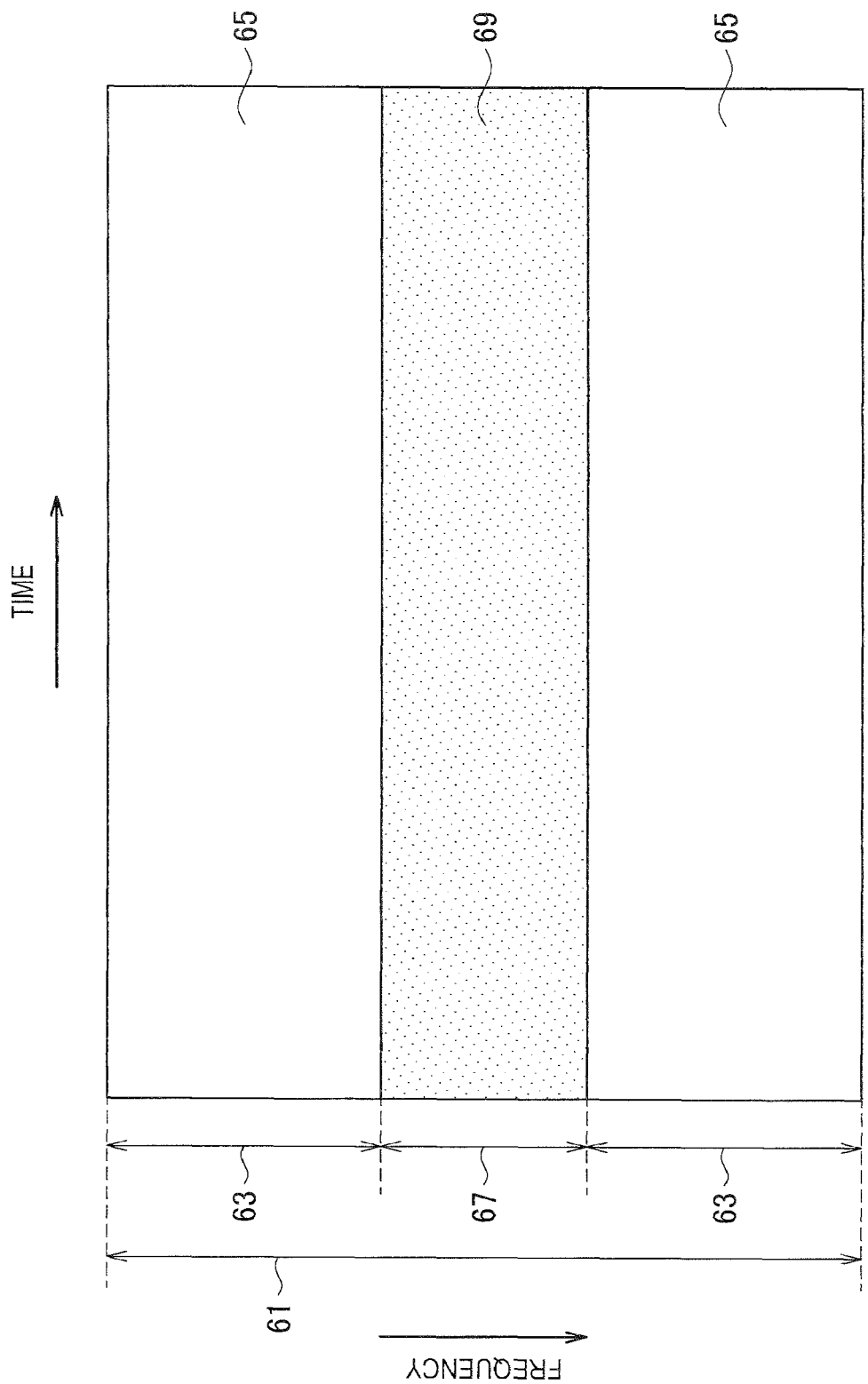
FIG. 16 is an explanatory diagram for describing an example of beamforming in some bands.
Figure 17:
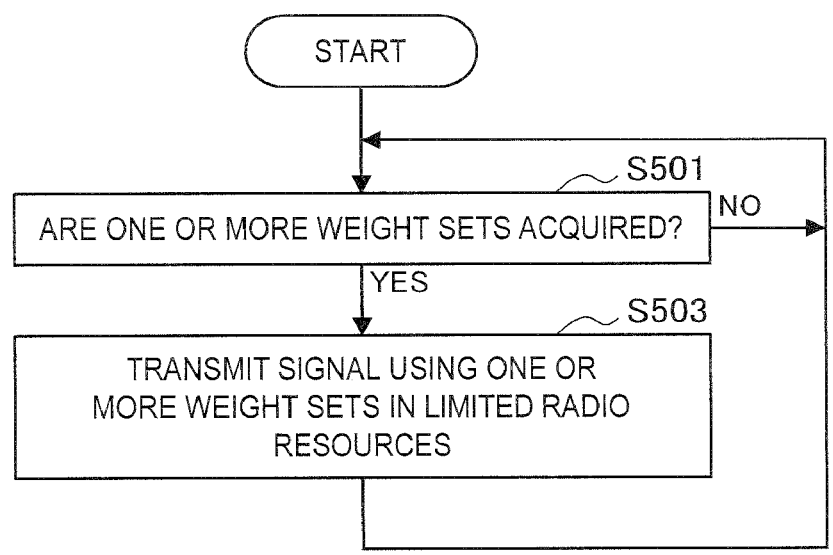
FIG. 17 is a flowchart illustrating an example of a schematic flow of a process according to the third embodiment.

FIG. 16 is an explanatory diagram for describing an example of beamforming in some bands. Referring to FIG. 16, radio resources of a CC 61 are shown. The CC 61 includes a band 63 and a band 65. That is, the band 63 is a part of a band within a CC 57 and is a band other than the band 65. For example, one or more weight sets are used to transmit a signal in (a part of or all of) a radio resource 67 of the band 63 within the CC 61. On the other hand, none of the weight sets are used to transmit a signal in a radio resource 69 of the band 65 within the CC 61. Accordingly, beamforming is performed in the band 63 but beamforming is not performed in the band 65. In this example, the predetermined band 65 is a band of a predetermined width at a center of the CC 61. The predetermined width is a width that corresponds to, for example, 6 resource blocks.

Accordingly, for example, since no influence of a beam is received in the predetermined band, a received signal strength (for example, RSSI) in the predetermined band does not significantly vary. Therefore, for example, stable received quality (for example, RSRQ) is calculated based on the received signal strength. That is, a decrease in reliability of received quality information is suppressed. Therefore, a cell that is more preferable for the terminal device 200-3 may be selected.

The control unit 163 notifies the terminal device 200-3 of the predetermined band. Accordingly, for example, the terminal device 200-3 can measure a received signal strength in the predetermined band.

(b-3) Others

For example, the limited radio resources include radio resources of symbols in which physical downlink shared channels are arranged but do not include radio resources of symbols in which physical downlink control channels (PDCCHs) are arranged. As an example, the limited radio resources include radio resources of 4th to 14th symbols but do not include radio resources of 1st to 3rd symbols among subframes including 14 symbols.

<5.2. Process Flow>

Next, an example of a process according to the third embodiment will be described with reference to FIG. 17. FIG. 17 is a flowchart illustrating an example of a schematic flow of a process according to the third embodiment.

The information acquiring unit 161 acquires one or more weight sets for beamforming (S501).

Then, the base station 100-3 transmits a signal using the one or more weight sets in limited radio resources under control of the control unit 163 (S503). The base station 100-3 transmits the signal without using the one or more weight sets in other wireless references under control of the control unit 163. Then, the process returns to Step S501.

The third embodiment has been described above. The third embodiment may be combined with the first embodiment. For example, the base station 100-1 according to the first embodiment may operate in the same manner as the base station 100-3 according to the third embodiment. More specifically, for example, the control unit 153 according to the first embodiment may control wireless communication by the base station 100-1 in the same manner as in the control of wireless communication of the base station 100-3 by the control unit 163 according to the third embodiment.

6. APPLICATION EXAMPLES

The technology according to the present disclosure is applicable to a variety of products. The base station 100 may also be implemented, for example, as any type of evolved Node B (eNB) such as macro eNBs and small eNBs. Small eNBs may cover smaller cells than the macrocells of pico eNBs, micro eNBs, or home (femt) eNBs. Instead, the base station 100 may be implemented as another type of base station such as Nodes B or base transceiver stations (BTSs). The base station 100 may include the main apparatus (which is also referred to as base station apparatus) that controls wireless communication and one or more remote radio heads (RRHs) that are disposed at different locations from that of the main apparatus. Further, various types of terminals as will be discussed later may temporarily or semi-persistently execute the base station function to operate as the base station 100. Further, at least part of components of the base station 100 may be implemented in a base station device or a module for the base station device.

The terminal device 200 may be implemented as a mobile terminal such as smartphones, tablet personal computers (PCs), notebook PCs, portable game terminals, portable/dongle mobile routers, and digital cameras, or an in-vehicle terminal such as car navigation apparatuses. The terminal device 200 may also be implemented as a terminal (which is also referred to as machine type communication (MTC) terminal) that performs machine to machine (M2M) communication. Furthermore, at least part of components of the terminal device 200 may be implemented as a module (e.g. integrated circuit module constituted with a single die) that is mounted on these terminals.

6.1. Application Examples for Base Station

First Application Example

Figure 18:
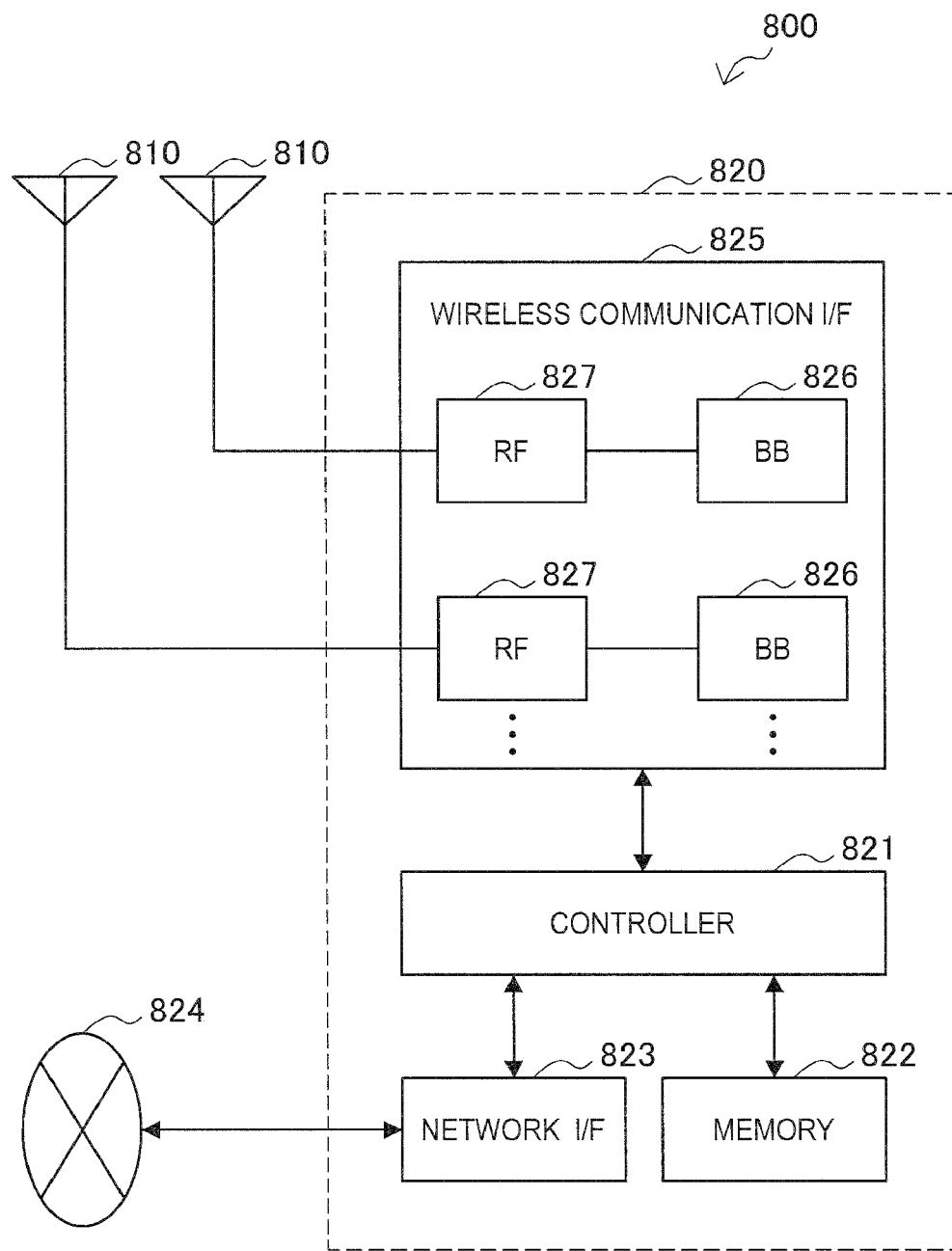
FIG. 18 is a block diagram illustrating a first example of a schematic configuration of an eNB.

FIG. 18 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g. a plurality of antenna elements constituting a MIMO antenna) and is used for the base station apparatus 820 to transmit and receive a wireless signal. The eNB 800 may include the plurality of the antennas 810 as illustrated in FIG. 18, and the plurality of antennas 810 may, for example, correspond to a plurality of frequency bands used by the eNB 800. It should be noted that while FIG. 18 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. The controller 821 may also have a logical function of performing control such as radio resource control, radio bearer control, mobility management, admission control, and scheduling. The control may be performed in cooperation with a surrounding eNB or a core network. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the controller 821 may be mutually connected to the eNB 800 and a core network node or another eNB through a logical interface (e.g. S1 interface or X2 interface). The network interface 823 may be a wired communication interface or a wireless communication interface for wireless backhaul. When the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826 and an RF circuit 827. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have part or all of the logical functions as discussed above instead of the controller 821. The BB processor 826 may be a module including a memory having a communication control program stored therein, a processor to execute the program, and a related circuit, and the function of the BB processor 826 may be changeable by updating the program. The module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 18, and the plurality of BB processors 826 may, for example, correspond to a plurality of frequency bands used by the eNB 800. The wireless communication interface 825 may also include a plurality of the RF circuits 827, as illustrated in FIG. 18, and the plurality of RF circuits 827 may, for example, correspond to a plurality of antenna elements. FIG. 18 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 18, the information acquiring unit 151 and the control unit 153 described above with reference to FIG. 6 may be mounted in the wireless communication interface 825. Alternatively, at least some of the components may be mounted in the controller 821. As an example, the eNB 800 may be equipped with a module including some or all components of the wireless communication interface 825 (for example, the BB processor 826) and/or the controller 821, and the information acquiring unit 151 and the control unit 153 above may be mounted in the module. In this case, the module may store a program causing the processor to function as the information acquiring unit 151 and the control unit 153 above (that is, a program causing the processor to perform the operation of the information acquiring unit 151 and the control unit 153 above) and execute the program. As another example, the program causing the processor to function as the information acquiring unit 151 and the control unit 153 above may be installed in the eNB 800, and the wireless communication interface 825 (for example, the BB processor 826) and/or the controller 821 may execute the program. As described above, the eNB 800, the base station apparatus 820, or the module may be provided as an apparatus including the information acquiring unit 151 and the control unit 153 above, and the program causing the processor to function as the information acquiring unit 151 and the control unit 153 above may be provided. A readable recording medium in which the program is recorded may be provided. For these points, the information acquiring unit 161 and the control unit 163 described above with reference to FIG. 15 are the same as the information acquiring unit 151 and the control unit 153.

In the eNB 800 illustrated in FIG. 18, the wireless communication unit 120 described above with reference to FIG. 6 may be mounted in the wireless communication interface 825 (for example, the RF circuit 827). The antenna unit 110 may be mounted in the antenna 810. The network communication unit 130 may be mounted in the controller 821 and/or the network interface 823.

Second Application Example

Figure 19:
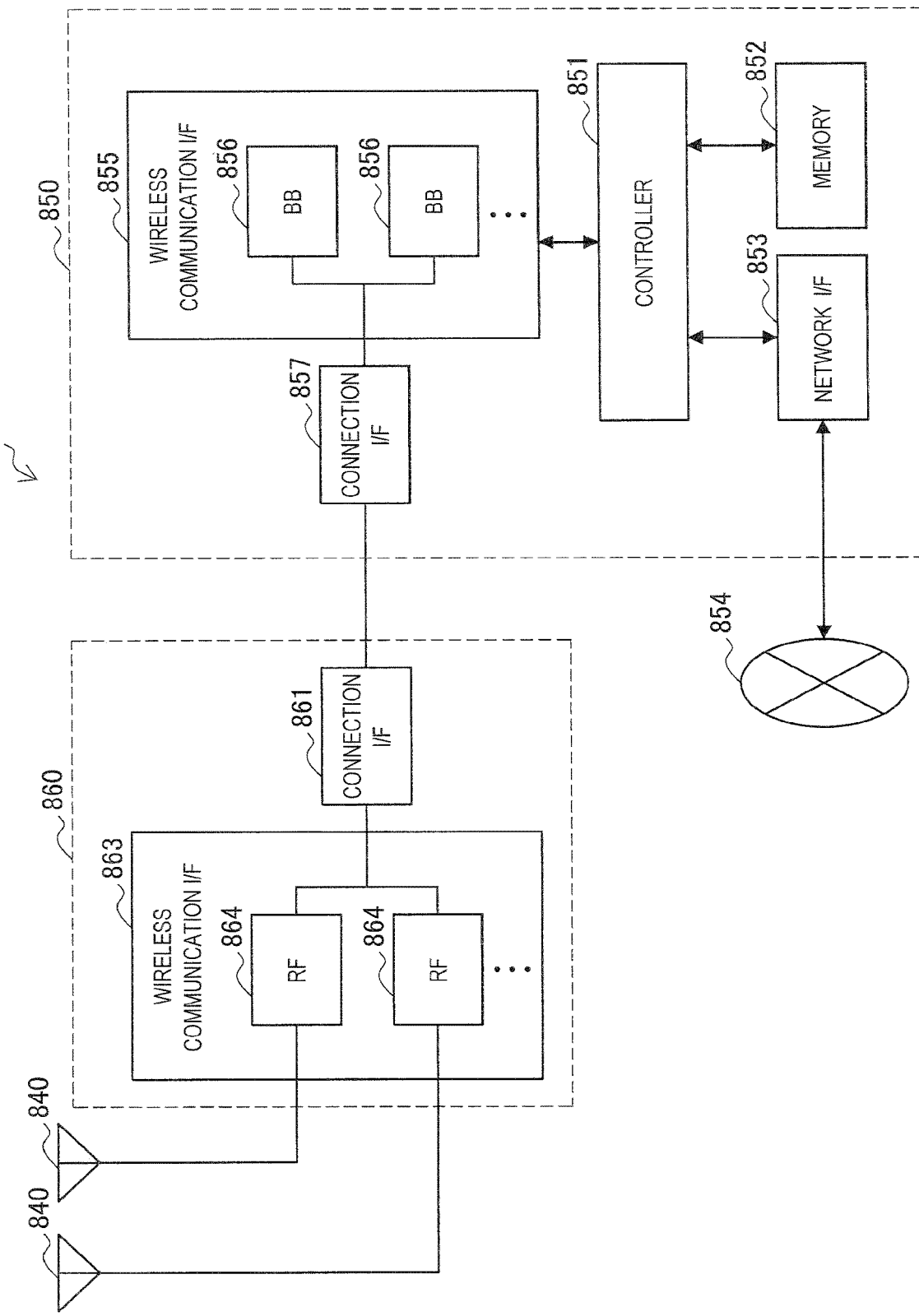
FIG. 19 is a block diagram illustrating a second example of the schematic configuration of the eNB.

FIG. 19 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. The base station apparatus 850 and the RRH 860 may be connected to each other by a high speed line such as optical fiber cables.

Each of the antennas 840 includes a single or a plurality of antenna elements (e.g. antenna elements constituting a MIMO antenna), and is used for the RRH 860 to transmit and receive a wireless signal. The eNB 830 may include a plurality of the antennas 840 as illustrated in FIG. 19, and the plurality of antennas 840 may, for example, correspond to a plurality of frequency bands used by the eNB 830. FIG. 19 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 18.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856. The BB processor 856 is the same as the BB processor 826 described with reference to FIG. 18 except that the BB processor 856 is connected to an RF circuit 864 of the RRH 860 via the connection interface 857. The wireless communication interface 855 may include a plurality of the BB processors 856, as illustrated in FIG. 19, and the plurality of BB processors 856 may, for example, correspond to a plurality of frequency bands used by the eNB 830 respectively. FIG. 19 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864. The RF circuit 864 may include a mixer, a filter, an amplifier and the like, and transmits and receives a wireless signal via the antenna 840. The wireless communication interface 863 may include a plurality of the RF circuits 864 as illustrated in FIG. 19, and the plurality of RF circuits 864 may, for example, correspond to a plurality of antenna elements. FIG. 19 illustrates an example in which the wireless communication interface 863 includes the plurality of RF circuits 864, but the wireless communication interface 863 may include the single RF circuit 864.

In the eNB 830 illustrated in FIG. 19, the information acquiring unit 151 and the control unit 153 described above with reference to FIG. 6 may be mounted in the wireless communication interface 855 and/or the wireless communication interface 863. Alternatively, at least some of the components may be mounted in the controller 851. As an example, the eNB 830 may be equipped with a module including some or all components of the wireless communication interface 855 (for example, the BB processor 856) and/or the controller 851, and the information acquiring unit 151 and the control unit 153 above may be mounted in the module. In this case, the module may store a program causing the processor to function as the information acquiring unit 151 and the control unit 153 above (that is, a program causing the processor to perform the operation of the information acquiring unit 151 and the control unit 153 above) and execute the program. As another example, the program causing the processor to function as the information acquiring unit 151 and the control unit 153 above may be installed in the eNB 830, and the wireless communication interface 855 (for example, the BB processor 856) and/or the controller 851 may execute the program. As described above, the eNB 830, the base station apparatus 850, or the module may be provided as an apparatus including the information acquiring unit 151 and the control unit 153 above, and the program causing the processor to function as the information acquiring unit 151 and the control unit 153 above may be provided. A readable recording medium in which the program is recorded may be provided. For these points, the information acquiring unit 161 and the control unit 163 described above with reference to FIG. 15 are the same as the information acquiring unit 151 and the control unit 153.

In the eNB 830 illustrated in FIG. 19, the wireless communication unit 120 described above with reference to FIG. 6 may be mounted in the wireless communication interface 863 (for example, the RF circuit 864). The antenna unit 110 may be mounted in the antenna 840. The network communication unit 130 may be mounted in the controller 851 and/or the network interface 853.

6.2. Application Examples for Terminal Device

First Application Example

Figure 20:
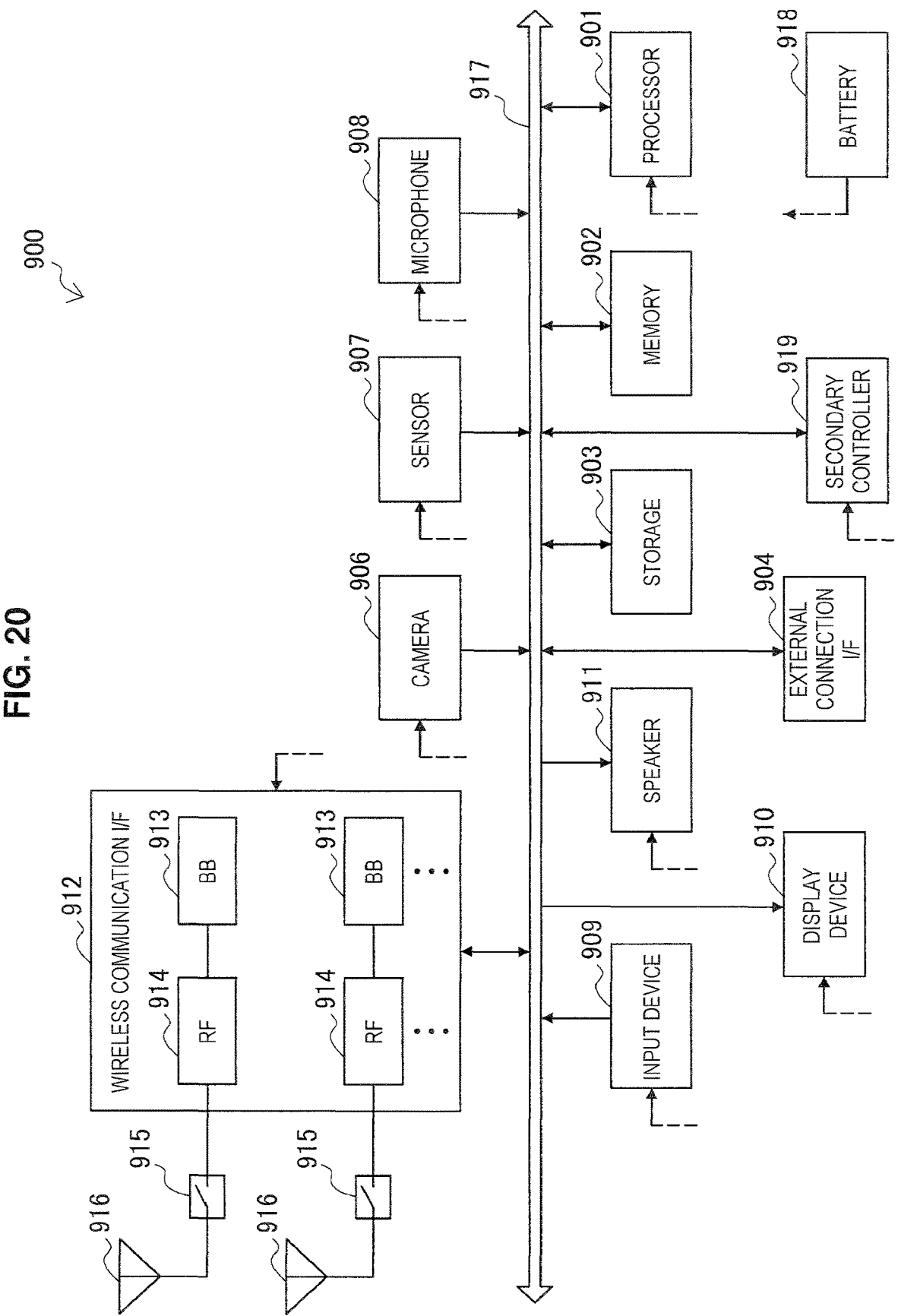
FIG. 20 is a block diagram illustrating an example of a schematic configuration of a smartphone.

FIG. 20 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and a secondary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, and an acceleration sensor. The microphone 908 converts a sound that is input into the smartphone 900 to an audio signal. The input device 909 includes, for example, a touch sensor which detects that a screen of the display device 910 is touched, a key pad, a keyboard, a button, or a switch, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 20. FIG. 20 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 20. FIG. 20 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the secondary controller 919 to each other. The battery 918 supplies electric power to each block of the smartphone 900 illustrated in FIG. 20 via a feeder line that is partially illustrated in the figure as a dashed line. The secondary controller 919, for example, operates a minimally necessary function of the smartphone 900 in a sleep mode.

In the smartphone 900 illustrated in FIG. 20, the information acquiring unit 241 and the control unit 243 described above with reference to FIG. 14 may be mounted in the wireless communication interface 912. Alternatively, at least some of the components may be mounted in the processor 901 or the secondary controller 919. As an example, the smartphone 900 may be equipped with a module including some or all components of the wireless communication interface 912 (for example, the BB processor 913), the processor 901, and/or the secondary controller 919, and the information acquiring unit 241 and the control unit 243 above may be mounted in the module. In this case, the module may store a program causing the processor to function as the information acquiring unit 241 and the control unit 243 above (that is, a program causing the processor to perform the operation of the information acquiring unit 241 and the control unit 243 above) and execute the program. As another example, the program causing the processor to function as the information acquiring unit 241 and the control unit 243 above may be installed in the smartphone 900, and the wireless communication interface 912 (for example, the BB processor 913), the processor 901, and/or the secondary controller 919 may execute the program. As described above, the smartphone 900 or the module may be provided as an apparatus including the information acquiring unit 241 and the control unit 243 above, and the program causing the processor to function as the information acquiring unit 241 and the control unit 243 above may be provided. A readable recording medium in which the program is recorded may be provided.

In the smartphone 900 illustrated in FIG. 20, for example, the wireless communication unit 220 described above with reference to FIG. 14 may be mounted in the wireless communication interface 912 (for example, the RF circuit 914). The antenna unit 210 may be mounted in the antenna 916.

Second Application Example

Figure 21:
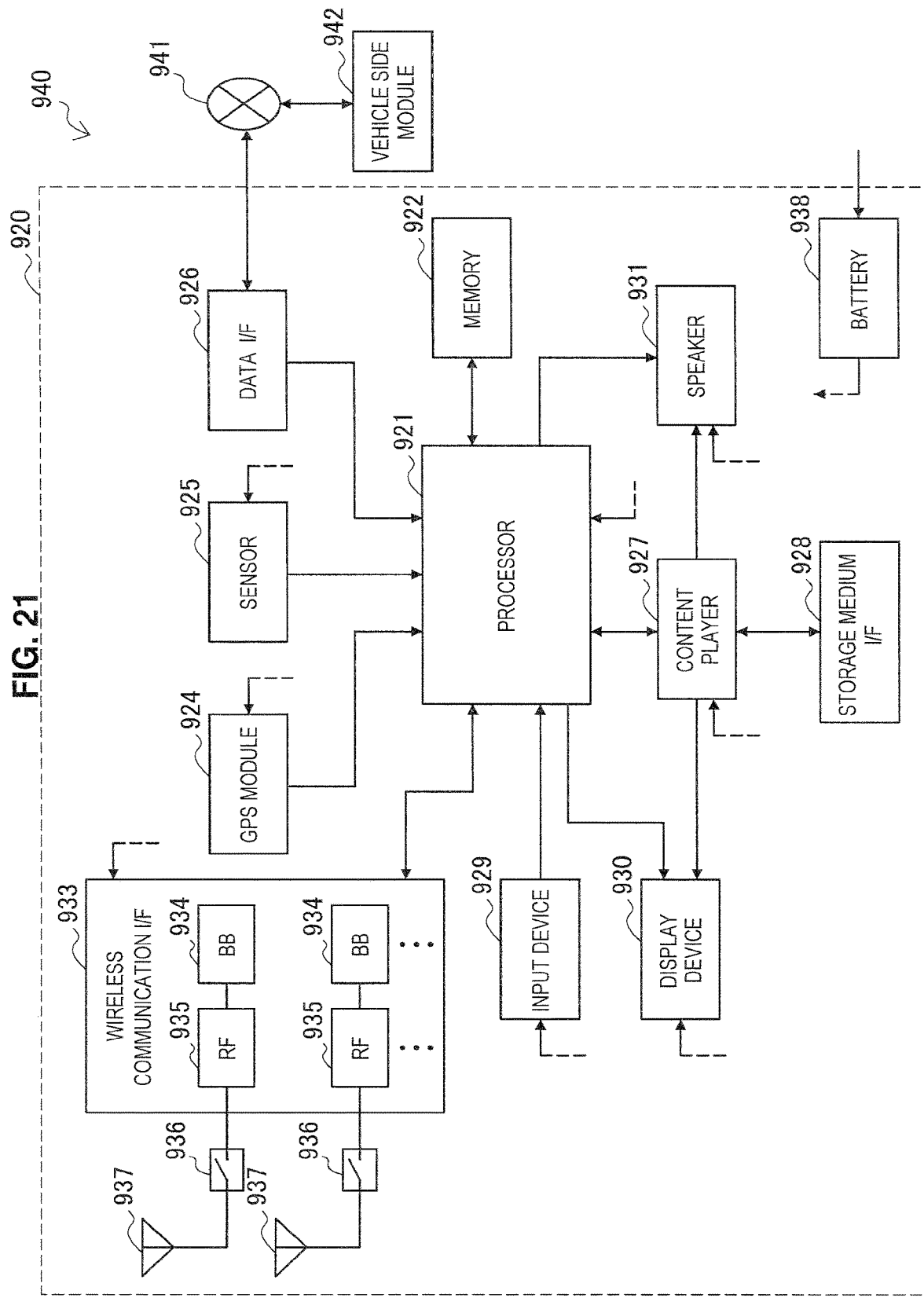
FIG. 21 is a block diagram illustrating an example of a schematic configuration of a car navigation apparatus.

FIG. 21 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g. latitude, longitude, and altitude) of the car navigation apparatus 920. The sensor 925 may include a sensor group including, for example, a gyro sensor, a geomagnetic sensor, and an air pressure sensor. The data interface 926 is, for example, connected to an in-vehicle network 941 via a terminal that is not illustrated, and acquires data such as vehicle speed data generated on the vehicle side.

The content player 927 reproduces content stored in a storage medium (e.g. CD or DVD) inserted into the storage medium interface 928. The input device 929 includes, for example, a touch sensor which detects that a screen of the display device 930 is touched, a button, or a switch, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 21. FIG. 21 illustrates an example in which the wireless communication interface 933 includes a plurality of BB processors 934 and a plurality of RF circuits 935, but the wireless communication interface 933 may be a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 includes a plurality of antennas 937 as illustrated in FIG. 21. FIG. 21 illustrates an example in which the car navigation apparatus 920 includes a plurality of antennas 937, but the car navigation apparatus 920 may include a single antenna 937.

Further, the smartphone 920 may include the antenna 937 for each wireless communication system. In this case, the antenna switch 936 may be omitted from a configuration of the car navigation apparatus 920.

The battery 950 supplies electric power to each block of the car navigation apparatus 930 illustrated in FIG. 21 via a feeder line that is partially illustrated in the figure as a dashed line. The battery 950 accumulates the electric power supplied from the vehicle.

In the car navigation apparatus 920 illustrated in FIG. 21, the information acquiring unit 241 and the control unit 243 included in the processing unit 240 described above with reference to FIG. 14 may be mounted in the wireless communication interface 933. Alternatively, at least some of the components may be mounted in the processor 921. As an example, the car navigation apparatus 920 may be equipped with a module including some or all components of the wireless communication interface 933 (for example, the BB processor 934) and/or the processor 921, and the information acquiring unit 241 and the control unit 243 above may be mounted in the module. In this case, the module may store a program causing the processor to function as the information acquiring unit 241 and the control unit 243 above (that is, a program causing the processor to perform the operation of the information acquiring unit 241 and the control unit 243 above) and execute the program. As another example, the program causing the processor to function as the information acquiring unit 241 and the control unit 243 above may be installed in the car navigation apparatus 920, and the wireless communication interface 933 (for example, the BB processor 934) and/or the processor 921 may execute the program. As described above, the car navigation apparatus 920, the base station apparatus 850, or the module may be provided as an apparatus including the information acquiring unit 241 and the control unit 243 above, and the program causing the processor to function as the information acquiring unit 241 and the control unit 243 above may be provided. A readable recording medium in which the program is recorded may be provided.

In the car navigation apparatus 920 illustrated in FIG. 21, for example, the wireless communication unit 220 described above with reference to FIG. 14 may be mounted in the wireless communication interface 933 (for example, the RF circuit 935). The antenna unit 210 may be mounted in the antenna 937.

Further, the technique according to the present disclosure may be implemented as an in-vehicle system (or a vehicle) 940 including one or more blocks of the above-described car navigation apparatus 920, an in-vehicle network 941 and a vehicle side module 942. That is, the in-vehicle system (or the vehicle) 940 may be provided as an apparatus including the information acquiring unit 241 and the control unit 243. The vehicle side module 942 generates vehicle side data such as vehicle speed, engine speed and failure information and outputs the generated data to the in-vehicle network 961.

7. CONCLUSION

The device and the processes according to the embodiments of the present disclosure have been described so far with reference to FIG. 3 to FIG. 21.

First Embodiment

According to the first embodiment, the base station 100-1 includes the information acquiring unit 151 configured to acquire received quality information indicating received quality of a reference signal in the terminal device 200-1 and the control unit 153 configured to perform cell selection for the terminal device 200-1 based on the received quality information. When predetermined condition related to use of weight sets for beamforming by the base station is satisfied, the control unit 153 does not perform the selection based on the received quality information.

Second Embodiment

According to the second embodiment, the terminal device 200-2 includes the information acquiring unit 241 configured to acquire received quality information indicating received quality of a reference signal in the terminal device 200-2 and the control unit 243 configured to perform cell selection for the terminal device 200-2 based on the received quality information. When a predetermined condition related to use of weight sets for beamforming by the base station is satisfied, the control unit 243 does not perform the selection based on the received quality information.

Third Embodiment

According to the third embodiment, the base station 100-3 includes the information acquiring unit 161 configured to acquire one or more weight sets for beamforming and the control unit 163 configured to control wireless communication by the base station 100-3 such that the base station 100-3 transmits a signal using the one or more weight sets. The control unit 163 controls the wireless communication such that the one or more weight sets are used to transmit a signal in limited radio resources.

According to the first to third embodiments, for example, it is possible to select a cell that is more preferable for a terminal device in an environment in which beamforming is performed.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while an example in which a communication system supports, for example, LTE, LTE-Advanced or a communication standard equivalent thereto has been described, the present disclosure is not limited thereto. For example, the communication system may be a system that supports another communication standard.

Further, it is not always necessary to execute the processing steps in the processing in the present specification in chronological order in order described in the flowcharts or the sequence diagrams. For example, the processing steps in the above-described processing may be executed in order different from the order described in the flowcharts or the sequence diagrams or may be executed in parallel.

Further, it is also possible to create a computer program for making a processor (such as, for example, a CPU and a DSP) provided at apparatuses (such as, for example, the base station, the base station device for the base station or the module of the base station device, or the terminal device or the module for the terminal device) in the present specification function as the above-described apparatuses (in other words, a computer program for making the processor execute operation of the components of the above-described apparatuses). Further, it is also possible to provide a recording medium having the above-described computer program recorded therein. Further, it is also possible to provide an apparatus (such as, for example, a finished product and a module (such as parts, processing circuits and chips) for the finished product) including a memory having the above-described computer program stored therein and one or more processors which can execute the above-described computer program. Further, a method including the operation of the components (for example, an information acquiring unit and the control unit) of the above-described apparatuses is included in the technique according to the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A device including:

an acquiring unit configured to acquire received quality information indicating received quality of a reference signal in a terminal device; and a control unit configured to perform cell selection for the terminal device based on the received quality information, wherein, when a predetermined condition related to use of weight sets for beamforming by a base station is satisfied, the control unit does not perform the selection based on the received quality information.

(2)

The device according to (1), wherein the predetermined condition is a condition that a use situation of the weight sets for beamforming by the base station be changed by a predetermined degree or more.

(3)

The device according to (2), wherein the predetermined condition is a condition that a weight set for beamforming used by the base station be changed by a predetermined degree or more.

(4)

The device according to (2), wherein the predetermined condition is a condition that a use frequency of the weight sets for beamforming by the base station be changed by a predetermined degree or more.

(5)

The device according to any one of (2) to (4), wherein the control unit does not perform the selection based on the received quality information for a predetermined period after the predetermined condition is satisfied.

(6)

The device according to (1), wherein the predetermined condition is a condition that a use frequency of the weight sets for beamforming by the base station be equal to or greater than a predetermined frequency.

(7)

The device according to (4) or (6), wherein the use frequency is an amount or a ratio of radio resources through which the base station transmits a signal using a weight set for beamforming, and the predetermined frequency is a predetermined amount or ratio.

(8)

The device according to any one of (1) to (7), wherein the reference signal is a reference signal that is transmitted in a frequency band, and the predetermined condition is a condition related to the use of the weight sets for beamforming by the base station in the frequency band.

(9)

The device according to any one of (1) to (8), wherein the base station is a base station to which the terminal device is connected or a neighbor base station of the base station to which the terminal device is connected.

(10)

The device according to any one of (1) to (9), wherein the device is a base station to which the terminal device is connected, a base station device for the base station, or a module for the base station device, the received quality information is information that is reported by the terminal device to the base station to which the terminal device is connected, and a cell is a target cell of a handover of the terminal device or a secondary cell of carrier aggregation for the terminal device.

(11)

The device according to any one of (1) to (9), wherein the device is the terminal device or a module for the terminal device, and the selection is cell selection or cell reselection by the terminal device.

(12)

The device according to (10), wherein the control unit controls wireless communication by the base station to which the terminal device is connected such that the base station to which the terminal device is connected transmits a signal using one or more weight sets for beamforming, and the control unit controls the wireless communication such that the one or more weight sets are used to transmit a signal in limited radio resources.

(13)

A method including:
acquiring received quality information indicating received quality of a reference signal in a terminal device; and
performing, by a processor, cell selection for the terminal device based on the received quality information,
wherein, when a predetermined condition related to use of weight sets for beamforming by a base station is satisfied, the selection is not performed based on the received quality information.

(14)

A device including:
an acquiring unit configured to acquire one or more weight sets for beamforming; and
a control unit configured to control wireless communication by a base station such that the base station transmits a signal using the one or more weight sets,
wherein the control unit controls the wireless communication such that the one or more weight sets are used to transmit a signal in limited radio resources.

(15)

The device according to (14), wherein the limited radio resources are radio resources of a predetermined amount or a predetermined ratio or less.

(16)

The device according to (14), wherein the limited radio resources are radio resources of some bands among frequency bands, and the some bands are bands other than a predetermined band among the frequency bands.

(17)

The device according to (16), wherein the control unit notifies a terminal device of the predetermined band.

(18)

The device according to any one of (14) to (17), wherein the control unit multiplies a signal by the one or more weight sets and thus controls the wireless communication.

(19)

The device according to any one of (14) to (18), wherein the device is the base station, a base station device for the base station, or a module for the base station device.

(20)

A method including:
acquiring one or more weight sets for beamforming; and
controlling, by a processor, wireless communication by a base station such that the base station transmits a signal using the one or more weight sets,
wherein the controlling of the wireless communication includes controlling, by the processor, the wireless communication such that the one or more weight sets are used to transmit a signal in limited radio resources.

(21)

A program for causing a processor to function as:
an acquiring unit configured to acquire received quality information indicating received quality of a reference signal in a terminal device; and
a control unit configured to perform cell selection for the terminal device based on the received quality information,
wherein, when a predetermined condition related to use of weight sets for beamforming by a base station is satisfied, the control unit does not perform the selection based on the received quality information.

(22)

A readable recording medium having a program recorded thereon, the program causing a processor to function as:

an acquiring unit configured to acquire received quality information indicating received quality of a reference signal in a terminal device; and a control unit configured to perform cell selection for the terminal device based on the received quality information, wherein, when a predetermined condition related to use of weight sets for beamforming by a base station is satisfied, the control unit does not perform the selection based on the received quality information.

(23)

A program for causing a processor to function as:

an acquiring unit configured to acquire one or more weight sets for beamforming; and a control unit configured to control wireless communication by a base station such that the base station transmits a signal using the one or more weight sets, wherein the control unit controls the wireless communication such that the one or more weight sets are used to transmit a signal in limited radio resources.

(24)

A readable recording medium having a program recorded thereon, the program causing a processor to function as:

an acquiring unit configured to acquire one or more weight sets for beamforming; and a control unit configured to control wireless communication by a base station such that the base station transmits a signal using the one or more weight sets, wherein the control unit controls the wireless communication such that the one or more weight sets are used to transmit a signal in limited radio resources.

REFERENCE SIGNS LIST 1 communication system
100 base station
151, 161 information acquiring unit
153, 163 control unit
200 terminal device
241 information acquiring unit
243 control unit

The invention claimed is:

1. A device configured to operate in a communication system including a base station configured to communicate with a terminal device, the device comprising:
   circuitry configured to perform as
      an acquiring unit configured to acquire received quality information indicating received quality of a reference signal received from the base station by the terminal device; and
      a control unit configured to perform cell selection or cell reselection for the terminal device based on the received quality information,
   wherein, the base station performs beamforming using a plurality of different weight sets over time, and when the control unit determines that a predetermined condition related to a variation over time of the weight sets for beamforming by the base station is satisfied, the control unit does not perform the cell selection or the cell reselection for the terminal device based on the received quality information.

2. The device according to claim 1,
wherein the predetermined condition is a condition that a use situation of the weight sets for beamforming by the base station be changed by a predetermined degree or more.

3. The device according to claim 2,
wherein the predetermined condition is a condition that a weight set for beamforming used by the base station be changed by a predetermined degree or more.

4. The device according to claim 2,
wherein the predetermined condition is a condition that a use frequency of the weight sets for beamforming by the base station be changed by a predetermined degree or more.

5. The device according to claim 2,
wherein the control unit does not perform the selection based on the received quality information for a predetermined period after the predetermined condition is satisfied.

6. The device according to claim 1,
wherein the predetermined condition is a condition that a use frequency of the weight sets for beamforming by the base station be equal to or greater than a predetermined frequency.

7. The device according to claim 4,
wherein the use frequency is an amount or a ratio of radio resources through which the base station transmits a signal using a weight set for beamforming, and
the predetermined frequency is a predetermined amount or ratio.

8. The device according to claim 1,
wherein the reference signal is a reference signal that is transmitted in a frequency band, and
the predetermined condition is a condition related to the use of the weight sets for beamforming by the base station in the frequency band.

9. The device according to claim 1,
wherein the base station is a base station to which the terminal device is connected or a neighbor base station of the base station to which the terminal device is connected.

10. The device according to claim 1,
wherein the device is included in the base station to which the terminal device is connected, a base station device for the base station, or a module for the base station device,
the received quality information is information that is reported by the terminal device to the base station to which the terminal device is connected, and
a cell is a target cell of a handover of the terminal device or a secondary cell of carrier aggregation for the terminal device.

11. The device according to claim 1,
wherein the device is included in the terminal device or a module for the terminal device.

12. The device according to claim 10,
wherein the control unit controls the base station to which the terminal device is connected to transmit a signal using one or more weight sets for beamforming, and
the control unit controls the base station to use the one or more weight sets to transmit a signal in limited radio resources.

13. A method of communicating in a communication system including a base station configured to communicate with a terminal device, the method comprising:
   acquiring received quality information indicating received quality of a reference signal received from the base station by the terminal device;
   performing, by a processor, cell selection or cell reselection for the terminal device based on the received quality information; and performing beamforming by the base station using a plurality of different weight sets over time, wherein, when the control unit determines that a predetermined condition related to a variation over time of the weight sets for beamforming by the base station is satisfied, the selection or the cell reselection for the terminal device is not performed based on the received quality information.

* * * * *